United States Patent
Yoshida

(10) Patent No.: US 7,636,040 B2
(45) Date of Patent: Dec. 22, 2009

(54) INFORMATION PROCESSING APPARATUS AND INFORMATION PROCESSING METHOD

(75) Inventor: Yasunari Yoshida, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 338 days.

(21) Appl. No.: 11/646,423

(22) Filed: Dec. 28, 2006

(65) Prior Publication Data

US 2007/0185979 A1 Aug. 9, 2007

(30) Foreign Application Priority Data

Dec. 28, 2005 (JP) ............... P2005-377042

(51) Int. Cl.
*G08B 25/00* (2006.01)
*G05B 15/00* (2006.01)

(52) U.S. Cl. ............... 340/525; 340/461; 340/7.55; 700/17; 700/83; 710/14; 358/1.1; 358/1.15

(58) Field of Classification Search ............... 340/525
See application file for complete search history.

(56) References Cited

U.S. PATENT DOCUMENTS

| | | | | |
|---|---|---|---|---|
| 5,859,885 | A * | 1/1999 | Rusnica et al. | 376/259 |
| 5,905,906 | A * | 5/1999 | Goffinet et al. | 710/8 |
| 6,052,740 | A * | 4/2000 | Frederick | 710/8 |
| 2003/0100963 | A1 * | 5/2003 | Potts et al. | 700/83 |
| 2003/0137681 | A1 | 7/2003 | Yamamura et al. | |
| 2003/0174359 | A1 * | 9/2003 | Gomi | 358/1.15 |
| 2004/0212813 | A1 * | 10/2004 | Kurashina | 358/1.1 |

FOREIGN PATENT DOCUMENTS

| | | | |
|---|---|---|---|
| JP | 2002-287924 | A | 10/2002 |
| JP | 2003-167714 | A | 6/2003 |
| JP | 2003-216362 | A | 7/2003 |
| JP | 2004-38296 | A | 2/2004 |
| JP | 2004-171601 | A | 6/2004 |

* cited by examiner

*Primary Examiner*—Donnie L Crosland
(74) *Attorney, Agent, or Firm*—Baker Botts, LLP.

(57) ABSTRACT

An information processing apparatus for displaying and setting operating conditions of a peripheral device, includes: a display unit; an operating condition selection unit; a first comparison unit; and a first display control unit. The operating condition selection unit selects two or more operating conditions from a plurality of operating conditions. The first comparison unit comparing the selected two or more operating conditions for each of a plurality of operating condition items that constitute each operating condition. The first display control unit controls the display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

17 Claims, 30 Drawing Sheets

INFORMATION PROCESSING APPARATUS AND INFORMATION PROCESSING METHOD

CROSS REFERENCE TO RELATED APPLICATION

This application claims priority from Japanese Patent Application No. 2005-377042 filed Dec. 28, 2005, the entire content of which is incorporated herein by reference.

TECHNICAL FIELD

The present invention relates to an information processing apparatus for setting the operating condition of a peripheral device and, more particularly, to a processing technique for managing the operating condition of a peripheral device such as a printer, a scanner, or a multifunction device, in an information processing apparatus on which a driver software for controlling the peripheral device has been installed.

BACKGROUND

When printing text data or image data on recording paper using a printer connected to a personal computer or the like, a printer driver must be first installed on the personal computer for controlling the printer. The printer driver is generally distributed to the user in a form stored on a CD-ROM or other storage medium, or in a form already incorporated in the operating system of the personal computer.

When installing a printer driver from a CD-ROM, the CD-ROM is first inserted into a media-reading device provided in the personal computer. In this case, the installer is started automatically. The installer displays a window on the display of the personal computer having an install wizard format. Through this window, the user specifies the directory (folder) for installing the driver and performs other settings. After inputting an install command, the printer driver stored on the CD-ROM is installed in the specified directory. When the printer driver is installed on the personal computer, a virtual printer is created on the personal computer.

However, there has been a trend in recent years to increase the number of settings in the printing conditions as the printers are being provided with more functions. With this increase in settings, more operations and more time are required for setting the printing conditions. This is particularly inconvenient to users wishing to change settings on the printer as the user must switch through numerous screens and often cannot easily reach the screen needed to perform the desired setting. However, the difficulties can be overcome by using technologies disclosed in Japanese unexamined patent application publication Nos. 2004-38296 and 2002-287924. These publications propose registering a plurality of virtual printers having different default printing conditions on a personal computer, and enabling the user to execute a printing process according to desired printing conditions simply by selecting the virtual printer conforming to the desired printing conditions. In this way, desired printing results can be easily obtained without having to set each of a plurality of printing conditions to the desired values.

Japanese Patent Application Laid-Open Publication No. 2003-167714 and U.S. Patent Application Publication No. 2003/0137681A1 propose a technique that compares printing condition manually set by a user and default printing condition previously set to default values and, if there is any setting item whose content is different from the content set in the default printing condition, displays the relevant setting item in a different manner from other setting items using color coding.

SUMMARY

However, if a plurality of printer drivers having different printing conditions are installed in a PC, a user cannot grasp the respective contents of the printer drivers, and becomes unable to make a decision as to which printer driver is to be used. Even if a specific name reflecting the setting of each printer driver is assigned to each printer driver, a user cannot grasp the detailed setting of the printer driver from the name. Thus, in order to know the setting concerning the printing condition of each printer driver, a user needs to perform the following tasks for each printer driver: opening a property window (window for setting the printing condition) of a virtual printer corresponding to a target printer driver and confirming the settings of the printing condition on the window. Such a task is quite troublesome. Further, the technique disclosed in Japanese Patent Application Laid-Open Publication No. 2003-167714 and U.S. Patent Application Publication No. 2003/0137681A1 can display the setting item whose content is different from the content set in the default printing condition. Thus, the problem that a user feels confusion about selection of a desired printer driver cannot still be solved.

In view of the foregoing, it is an object of the invention to provide an improved information processing apparatus and an improved information processing method that are capable of enabling a user to effectively select an operating condition.

In order to attain the above and other objects, the invention provides an information processing apparatus for displaying and setting operating conditions of a peripheral device, the information processing apparatus including: a display unit; an operating condition selection unit; a first comparison unit; and a first display control unit. The operating condition selection unit selects two or more operating conditions from a plurality of operating conditions. The first comparison unit comparing the selected two or more operating conditions for each of a plurality of operating condition items that constitute each operating condition. The first display control unit controls the display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

According to another aspect, the invention provides an information processing method for displaying and setting operating conditions of a peripheral device, the information processing method including: selecting two or more operating conditions from a plurality of operating conditions; comparing the selected two or more operating conditions for each of a plurality of operating condition items that constitute each operating condition; and controlling a display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

According to another aspect, the invention provides a storage medium storing a set of program instructions, executable on a data processing device, for displaying and setting operating conditions of a peripheral device, the instructions including: selecting two or more operating conditions from a plurality of operating conditions; comparing the selected two or more operating conditions for each of a plurality of operating condition items that constitute each operating condition; and controlling a display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

BRIEF DESCRIPTION OF THE DRAWINGS

The particular features and advantages of the invention as well as other objects will become apparent from the following description taken in connection with the accompanying drawings in which.

DETAILED DESCRIPTION

Figure 1:
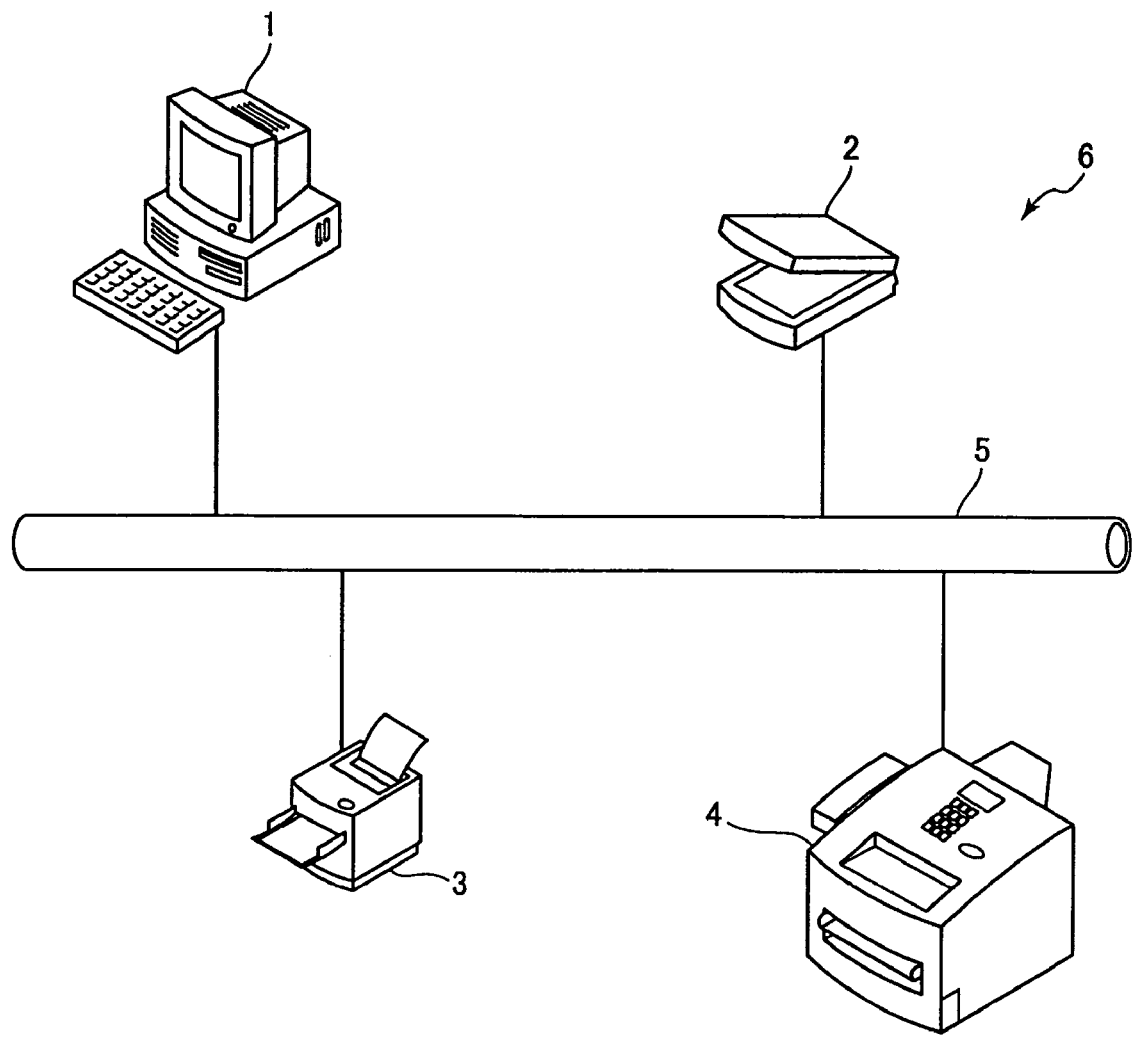
FIG. 1 is a system block diagram schematically showing a network environment where a scanner, a printer, and a multifunction device are connected to a PC.

An information processing apparatus and an information processing method according to an embodiment of the invention will be described while referring to the accompanying drawings wherein like parts and components are designated by the same reference numerals to avoid duplicating description.

FIG. 1 shows a network system 6 which includes a personal computer (PC) 1. The PC 1 is connected to and capable of communicating with a scanner 2, a printer 3, and a multifunction device 4 via a LAN or other network 5. The PC 1 serves as a data processing device according to the embodiment that controls driver software such as a printer driver and a scanner driver installed on the personal computer 1 in the network system 6. It is noted that the PC 1 may be connected directly to the scanner 2, printer 3, and multifunction device 4 through serial cables, USB cables, or the like, rather than the network 5.

Next, the overall structure of the personal computer 1 will be described with reference to FIG. 2.

Figure 2:
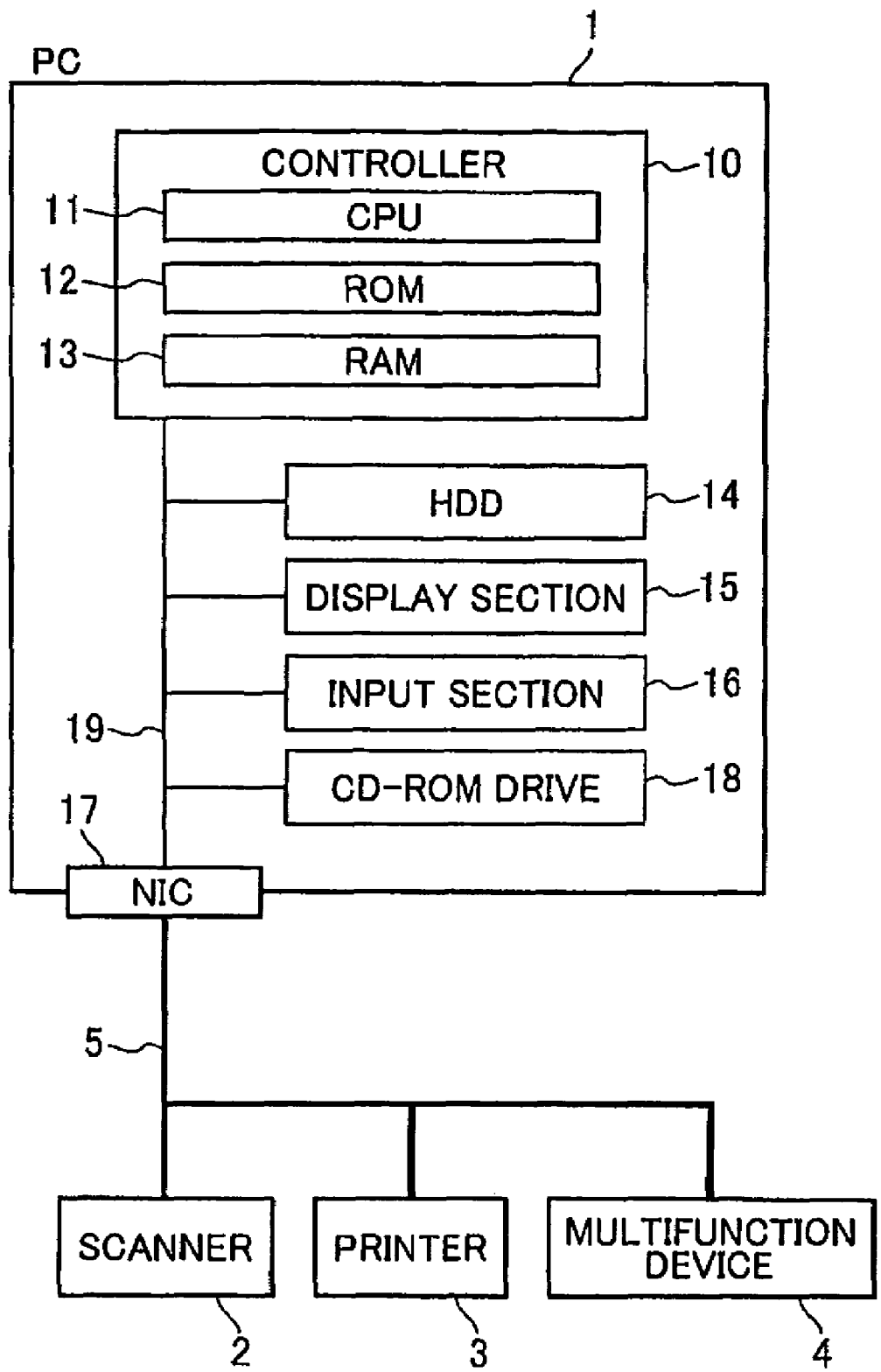
FIG. 2 is a block diagram schematically showing a configuration of the PC in the network environment of FIG. 1.

FIG. 2 is a block diagram illustrating the general structure of the personal computer 1. As shown in FIG. 2, the personal computer 1 includes: a controller 10; a hard disk drive 14 for storing various programs and data; a display section 15 such as a liquid crystal display; an input section 16 such as a keyboard, a tablet, a mouse, and a touch panel; a CD-ROM drive 18 for reading data stored on a CD-ROM, and a network interface card (NIC) 17 such as a LAN adapter for connecting the personal computer 1 to the network 5. All of these components are connected to each other and are capable of communicating with each other via an internal bus 19. Here, the personal computer 1 is a common computer capable of performing general computations and storage processes and does not employ any special hardware. Hence, the personal computer 1 is not limited to the above-described structure. A terminal device, such as a personal digital assistant (PDA) or a cellular telephone having a built-in computer may be employed instead of the PC 1.

The hard disk drive 14 is integrally configured of a high-capacity disk and a reading device. The hard disk drive 14 stores the operating system (OS) of the personal computer 1, the applications software, driver software for controlling the peripheral devices connected to the personal computer 1, and various data including setting data for the OS and the driver software. The applications software performs when the operations system is operating.

Further, a software program called "Driver comparison tool" in this embodiment is stored in the HDD 14. When this software program is read out and executed, processing according to the procedure shown in the flowchart (FIGS. 12 to 22) to be described later is performed. The driver software and the software program "Driver comparison tool" may be originally stored in a storage medium such as a CD-ROM and installed onto the HDD 14. Or, the drive software and the software program "Driver comparison tool" may be downloaded to the PC 1 from the network such as the Internet.

In the embodiment described below, the Windows (registered trademark) operating system has been installed on the personal computer 1. In the Windows operating system, the storage area of the HDD 14 which collectively manages the setting data is called "Registry".

The controller 10 is configured of such electronic devices as a CPU (central processing unit) 11, a ROM (read only memory) 12, and a RAM (random access memory) 13, and serves to control the entire parts of the PC 1. The controller 10 is commonly referred to as the motherboard of the personal computer 1 and allows the OS to operate on the personal computer 1. In the OS environment, the controller 10 enables the driver software, the software program "driver comparison tool", and the applications software installed in the personal computer 1 to be executed.

The display section 15 is an LCD (liquid crystal display) and is connected to the controller 10 via a video card or graphics card (not shown). When a driver software is installed on the personal computer 1, the controller 10 creates a virtual printer or a virtual scanner on the personal computer 1, as will be described later, that is displayed on the display section 15 as an icon. The display section 15 also displays a settings window (commonly called a Properties window) for setting scanning conditions of the scanner 2 and a scanner unit 21 of the multifunction device 4 and painting conditions of the printer 3 and the printer unit 20 of the multifunction device 4. The processing of displaying a user interface window such as the settings window on the display section 15 is achieved by a GUI (Graphical User Interface) function embodied by the graphic board and CPU 11 of the PC 1.

The input section 16 is an input device, such as a keyboard, a tablet, and a mouse. The input section 16 is connected to the controller 10 through a USB (universal serial bus) terminal (not shown) A printing instruction for printing documents, an operation of selecting a virtual printer in order to specify a printer for executing printing, and changes in setting items of the reading condition and printing condition are achieved by a user's operation using the input section 16. For example, a user can select his/her desired virtual driver by operating the position of the mouse pointer and by clicking the mouse.

Figure 3:
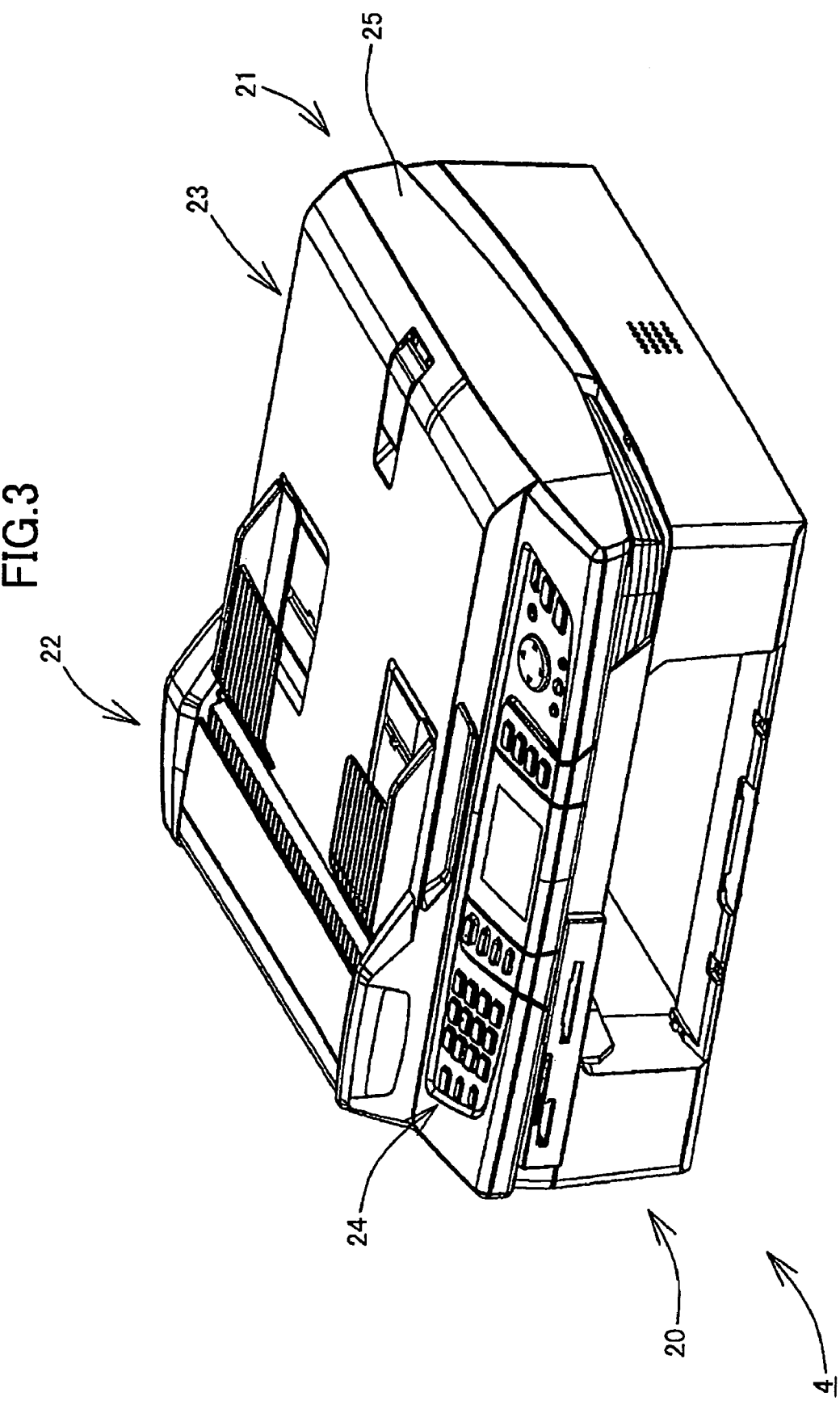
FIG. 3 is a perspective view of the multifunction device in the network environment of FIG. 1.

The multifunction device 4 will be described below with FIG. 3. As shown in FIG. 3, the multifunction device 4 includes the printer unit 20 disposed in the lower section thereof, a scanner unit 21 disposed in the upper section thereof, an original cover 23 including an automatic document feeder (ADF) 22, and a control panel 24 disposed on the front side of the top surface thereof. The multifunction device 4 has a printer function, scanner function, copier function, and facsimile function.

The printer unit 20 performs a printing process for recording images and text on recording paper based on print data including image data and text data transferred from the personal computer 1. The scanner unit 21 includes an image sensor, such as a CIS (contact image sensor; not shown), for scanning a document conveyed through the ADF 22 or placed on a document support 25, and transfers the scanned image data to the hard disk drive 14 of the personal computer 1 or a storage device in the multifunction device 4 (memory, hard disk drive, or the like). Of course, the multifunction device 4 can also perform a copy process without exchanging data with the personal computer 1, wherein the scanner unit 21 scans an image from an original document, and the printer unit 20 records the image on recording paper. A printer driver installed on the personal computer 1 controls the printing process implemented on the printer unit 20, while a scanner driver installed on the personal computer 1 controls the scanning process implemented on the scanner unit 21.

The printer 3 has only the printer function that the multifunction device 4 possesses and, hence, is a dedicated device for printing images on recording paper based on print data received from the personal computer 1. The scanner 2 has only a scanner function and, hence, is a dedicated device for scanning image data from an original. These devices are controlled by the printer driver and scanner driver, respectively, installed on the personal computer 1.

Next, the printer driver which is a representative example of a driver software installed on the personal computer 1 will be described. Printer drivers are commonly distributed to users via the Internet or the like from the server of the manufacture that has created the driver, or are distributed on a CD-ROM or other storage medium. Thus distributed printer drivers to be applied to the printer unit 20 of the multifunction device 4 and to the printer 3 are installed on the PC 1 by a user. The installed printer driver is stored in the driver storage area allocated in the HDD 14.

After the install of the printer driver on the PC 1 has been completed, printing condition setting data having printing condition previously set to predetermined default values is stored in the registry in the HDD 14. At the same time, a virtual printer is generated on the PC 1 so that a user can easily select a printer that executes a printing operation when he or she needs to print a document. The virtual printer is managed in a predetermined directory (so-called printer folder) in association with the printing condition setting data stored in the registry. Thus, when the virtual printer is selected on a print window, printing condition setting data associated with the selected virtual printer is read out from the registry, and the printing condition described in the read out printing condition setting data is reflected on the printer driver.

The printing condition is information set for controlling printing processing performed by the printer unit 20 of the multifunction device 4 or printer 3 and includes a plurality of setting items such as <Paper type>, <Print quality>, <Frameless printing>, <Paper size>, <Layout>, <Print direction>, and <Number of sets>.

Generally, in the PC 1, a plurality of sets of printing condition setting data and a plurality of virtual printers associated with the respective sets of printing condition setting data can be registered for each printer driver installed. In this example, ten virtual printers to which different names are assigned are registered as shown in Table 1. As a matter of course, the number of virtual printers to be registered, printer's name, and printer's type are not limited to those shown in Table 1. Further, a plurality of sets of printing condition setting data uniquely associated with the respective virtual printers shown in Table 1 are stored in the registry. That is, the ten virtual printers are managed in their respective directories in association with ten sets of printing condition setting data having printing conditions different from one another. In this way, the plurality of virtual printers are registered in the PC 1 and the plurality of sets of printing condition setting data specific to the respective virtual printers are stored in the PC 1. So, simply selecting any virtual printer allows a user to activate a printer driver in which printing condition specific to the selected virtual printer has been set.

TABLE 1

| Printer name (Virtual printer) | |
| --- | --- |
| XXXX MFC-Printer | Default |
| XXXX MFC-Printer | Normal printing |
| XXXX MFC-Printer | Fine printing |
| XXXX MFC-Printer | High-speed printing |
| XXXX MFC-Printer | Photo printing |
| XXXX MFC-Printer | Paper saving printing |
| XXXX MFC-Printer | Postcard printing |
| XXXX MFC-Printer | Inkjet postcard printing |
| XXXX MFC-Printer | Web page printing |

As shown in Table 1, a specific name representing the contents of the printing condition of each virtual printer is assigned to each virtual printer. For example, the virtual printer "XXXX MFC-Printer Default" shown in Table 1 is set in a default printing condition that is previously defined by the manufacturer of the printer driver, so that a name "XXXX MFC-Printer Default" is assigned thereto. The printing condition of the virtual printer "XXXX MFC-Printer Default" is shown in Tables 2 and 3 for each setting item Table 2 shows the printing condition concerning <Basic setting>, and Table 3 shows the printing condition concerning <Advanced feature setting>.

TABLE 2

XXXX MFC-Printer Default

| | Setting item | | | Setting value |
| --- | --- | --- | --- | --- |
| Basic setting | Paper type | | | Regular |
| | Print quality | | | Normal |
| | Print quality detailed setting | Bi-directional printing | | ON |
| | | Normal (fine) printing | | OFF |
| | | Image quality emphasis | | OFF |
| | | Image emphasis detailed setting | Color density | 0 |
| | | | White balance | 0 |
| | | | Sharpness | 0 |
| | | | Automatic image processing | OFF |
| | | | Brightness | 0 |
| | | | Contrast | 0 |
| | | | Red | 0 |
| | | | Green | 0 |
| | | | Blue | 0 |
| | Frameless printing | | | OFF |
| | Paper size | | | A4 |
| | Layout | | | One page |
| | Partition line | | | None |
| | Print direction | | | Vertical |
| | Number of sets | | | 1 |
| | Print in units of pages | | | OFF |
| | Print in reverse order | | | OFF |

TABLE 3

XXXX MFC-Printer Default

| | | Setting item | | | Setting value |
| --- | --- | --- | --- | --- | --- |
| Advanced feature setting | Color | Color/Monochrome | | | Color |
| | | Image type | | | Automatic switching |
| | | Image type | Adjust to monitor | | ON |
| | | Detailed setting | Color correction | | Normal |
| | | | Half-tone | | Error diffusion |
| | Magnification | Scaling function | | | OFF |
| | | Print paper size | | | A4 |
| | | Magnification | | | 100% |
| | | Flip horizontal | | | OFF |
| | Watermark | Use watermark | | | OFF |
| | | Background printing | | | OFF |
| | | Outline printing | | | OFF |
| | | Select watermark | | | OFF |
| | | Watermark printing | | | All pages |
| | Other special function | Date and time printing | Print setting | | OFF |
| | | | Detailed setting | Date (format) | Tue, 16 Apr. 2002 |
| | | | | Time (format) | 19:49:43 |
| | | | | Font | Font type | Arial |
| | | | | | Style | Standard |
| | | | | | Size | 11 |
| | | | | | Strike through | OFF |
| | | | | | Underline | OFF |
| | | | | | Color | Black |
| | | | | | Character set | European |
| | | | Position | | Lower-right |
| | | | Mode | | Transparent printing |
| | | Quick print set-up | | Set-up setting | OFF |
| | | | | Layout | ON |
| | | | | Color/monochrome | ON |
| | | Status monitor | | | OFF |

As shown in the Tables 2 and 3 above, the printing condition is represented by a hierarchical structure of a plurality of setting items. More specifically, the printing condition includes six ranks of setting items: a first or highest rank of setting items; a second rank of setting items; a third rank of setting items; a fourth rank of setting items; a fifth rank of setting items; and a sixth or lowest rank of setting items.

The printing condition includes, in the highest rank, two setting items: <basic setting> and <advanced feature setting>. The printing condition includes, in the second rank, fifteen setting items: <paper type>, <print quality>, <print quality detailed setting>, <frameless printing>, <paper size>, <layout>, <partition line>, <print direction>, <number of sets>, <print in units of pages>, and <print in reverse order>, <color>, <magnification>, <watermark>, and <other special function>. The printing condition includes, in the third rank, nineteen setting items: <bi-directional printing>, <normal (fine) printing>, <image quality emphasis>, <image emphasis detailed setting>, <color/monochrome>, <image type>, <image type detailed setting>, <scaling function>, . . . , and <status monitor>. The printing condition includes, in the fourth rank, seventeen setting items: <color density>, <white balance>, <sharpness>, <blue>, <adjust to monitor>, <color correction>, <half-tone>, <print setting>, <detailed setting>, <set-upsetting>, <layout> and <color/monochrome>. The printing condition includes, in the fifth rank, five setting items: <date (format)>, <time (format)>, <font>, <position>, and <mode>.

The printing condition includes, in the sixth or lowest rank, seven setting items <font type>, <style>, <size>, <strike through>, <underline>, <color>, and <character set>.

The setting item <basic setting> includes, as immediately lower setting items, <paper type>, <print quality>, <print quality detailed setting>, <frameless printing>, <paper size>, <layout>, <partition line>, <print direction>, <number of sets>, <print in units of pages>, and <print in reverse order>. The setting item <print quality detailed setting> includes, as immediately lower setting items, <bi-directional printing>, <normal (fine) printing>, <image quality emphasis>, and <image emphasis detailed setting>. The setting item <image emphasis detailed setting> includes, as immediately lower setting items, <color density>, <white balance>, . . . and <blue>. The setting item <advanced feature setting> includes, as immediately lower setting items, <color>, <magnification>, <water mark>, and <other special function>.

It is noted that no setting values are provided in direct correspondence with the thirteen setting items <basic setting>, <print quality detailed setting>, <image emphasis detailed setting>, <advanced feature setting>, <color>, <image type detailed setting>, <magnification>, <watermark>, <other special function>, <date and time printing>, <detailed setting>, <font>, and <quick print set-up>, which will be collectively referred to as "title setting items", hereinafter. Each title setting item has at least one lower setting item of its own. In other words, there is at least one lower setting item relative to each title setting item. The title setting item indicates a common feature of all of the lower setting items relative to the title setting item. For example, the title setting item <print quality detailed setting> indicates the common feature for its lower setting items <bi-directional printing>, <normal (fine) printing>, <image quality emphasis>, and <image emphasis detailed setting>.

Figure 4:
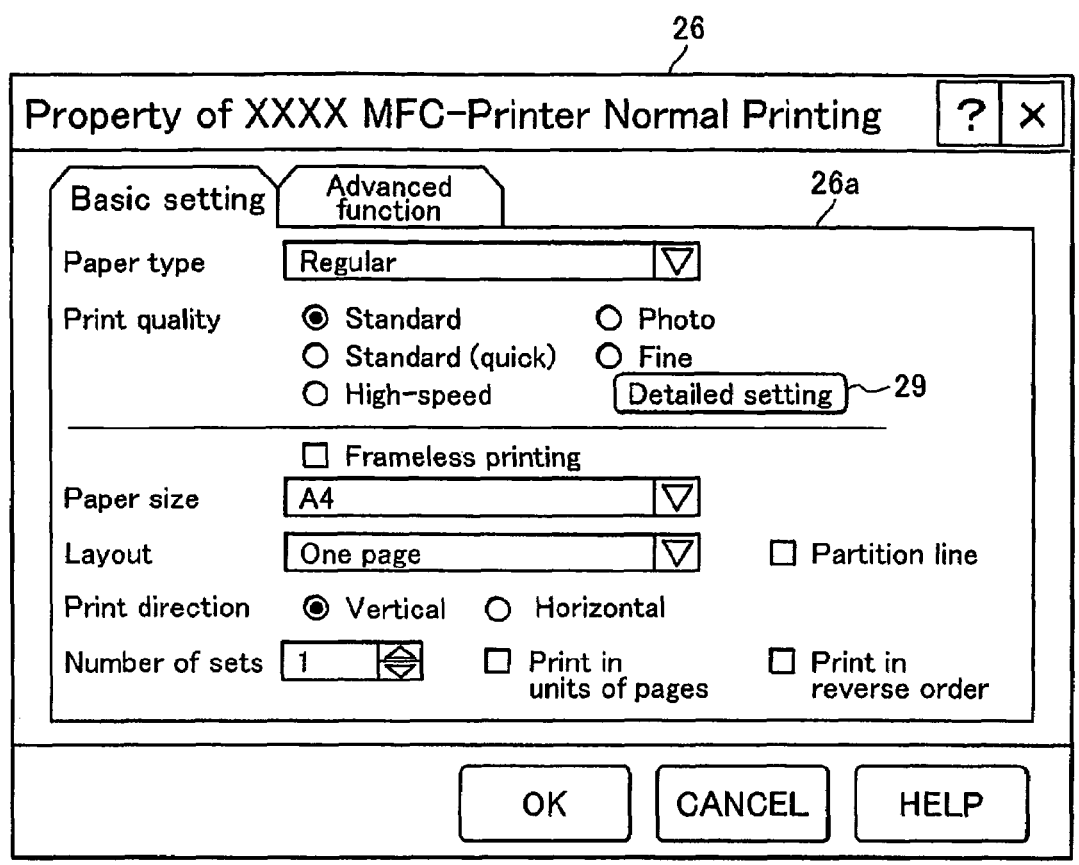
FIG. 4 is a view showing a property window of "XXXX MFC-Printer Normal printing"
Figure 5:
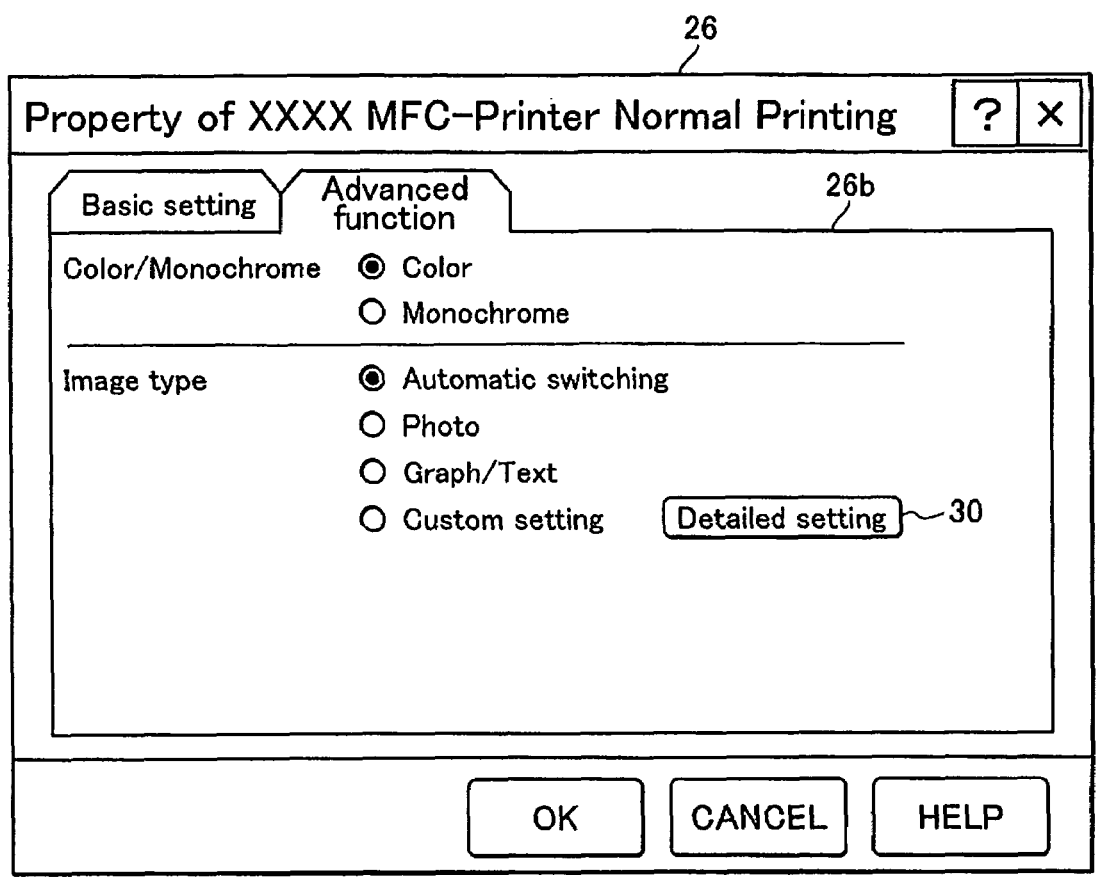
FIG. 5 is another view showing the property window of "XXXX MFC-Printer Normal printing"
Figure 6:
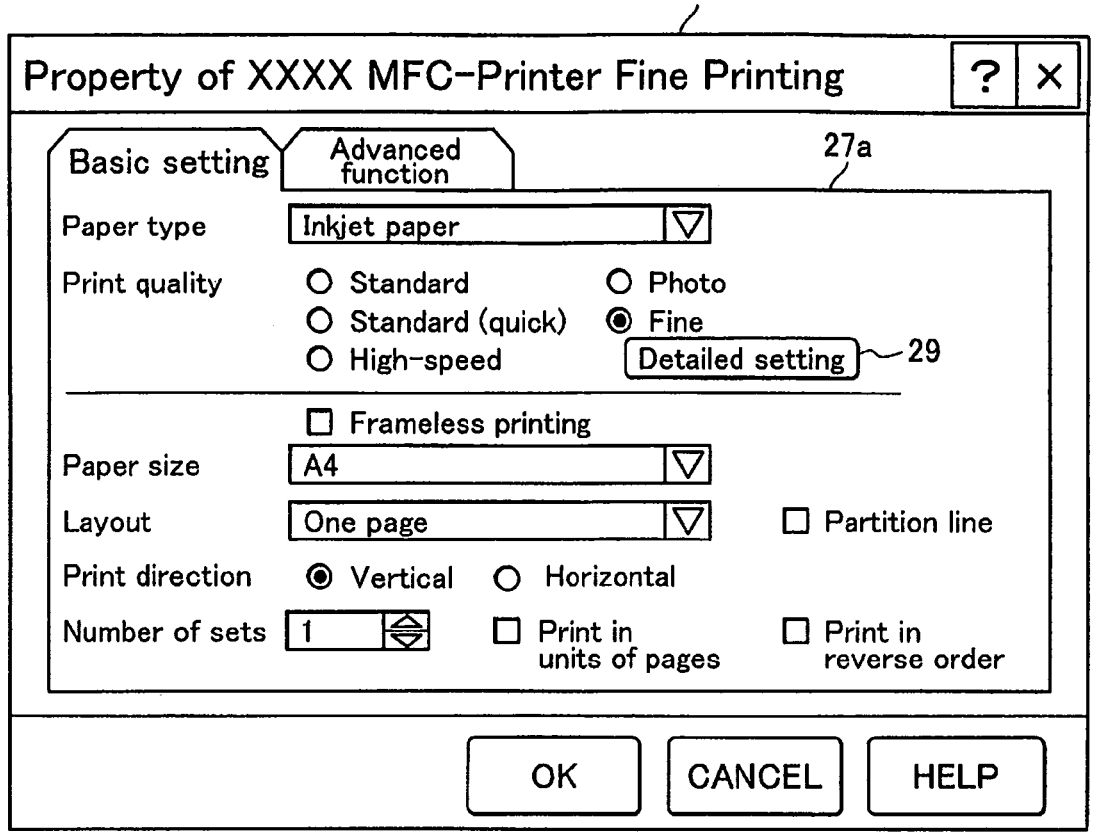
FIG. 6 is a view showing a property window of "XXXX MFC-Printer Fine printing"
Figure 7:
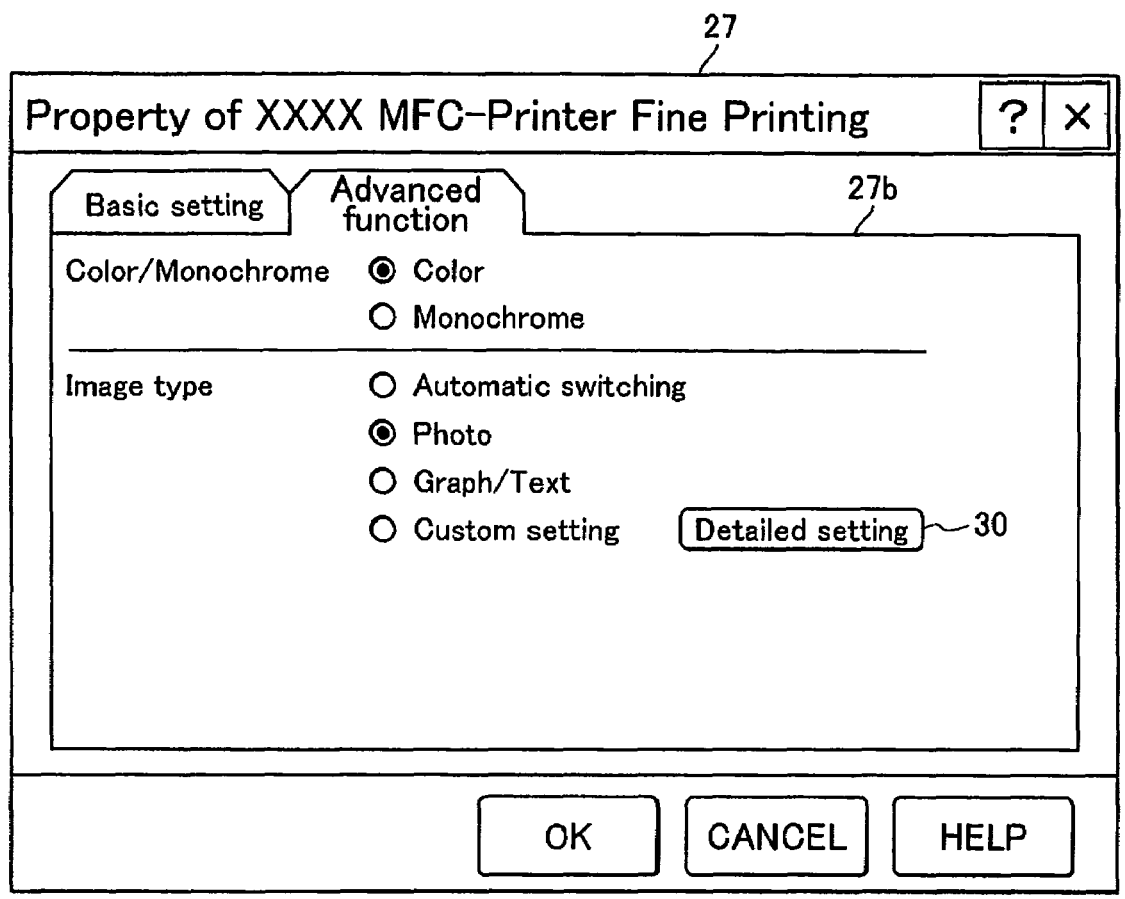
FIG. 7 is another view showing the property window of "XXXX MFC-Printer Fine printing"

In the virtual printer "XXXX MFC-Printer Normal printing" shown in Table 1, <Paper type> is set to "Regular", <Print quality> is set to "Standard (600 dpi)", <Paper size> is set to "A4", <Layout> is set to "One page", <Print direction> is "Vertical", and <Number of sets> is "1" as shown in a basic setting tab window 26a of a property window 26 of FIG. 4, and <Image type> is set to "Automatic switching" as shown in an advanced feature tab window 26b of the property window 26 of FIG. 5. That is, printing condition frequently used is set to this virtual printer and, therefore, a name "XXXX MFC-Printer Normal printing" is assigned to the relevant virtual printer. Note that the other setting items are the same as those in the "XXXX MFC-Printer Default". FIGS. 4 and 5 are views showing the property window 26 of the virtual printer "XXXX MFC-Printer Normal printing". FIGS. 6 and 7 which are to be referred to in the following description are views showing a property window 27 of the virtual printer "XXXX MFC-Printer Fine printing" and FIGS. 8 and 9 are views showing a property window 28 of the printer driver "XXXX MFC-Printer Photo printing"

In the virtual printer "XXXX MFC-Printer Fine printing" shown in Table 1, <Paper type> is set to "Inkjet paper", and <Print quality> is set to "Fine (1200 dpi)" as shown in a basic setting tab window 27a of a property window 27 of FIG. 6, and <Image type> is set to "Photo" as shown in an advanced feature tab window 27b of the property window 27 of FIG. 7. Therefore, a name "XXXX MFC-Printer Fine printing" is assigned to the relevant virtual printer so that a user can grasp the settings concerning the print quality without opening the property window. Note that the other setting items are the same as those in the "XXXX MFC-Printer Default".

Figure 8:
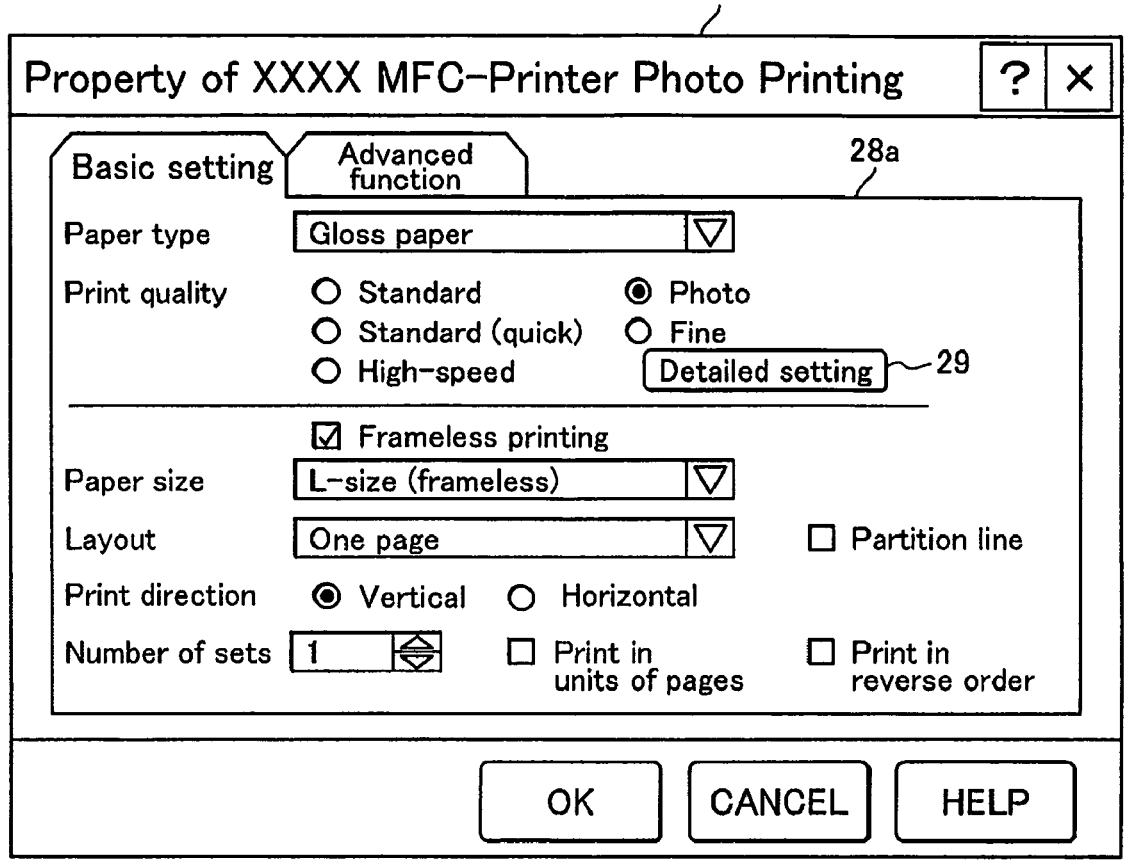
FIG. 8 is a view showing a property window of "XXXX MFC-Printer Photo printing"
Figure 9:
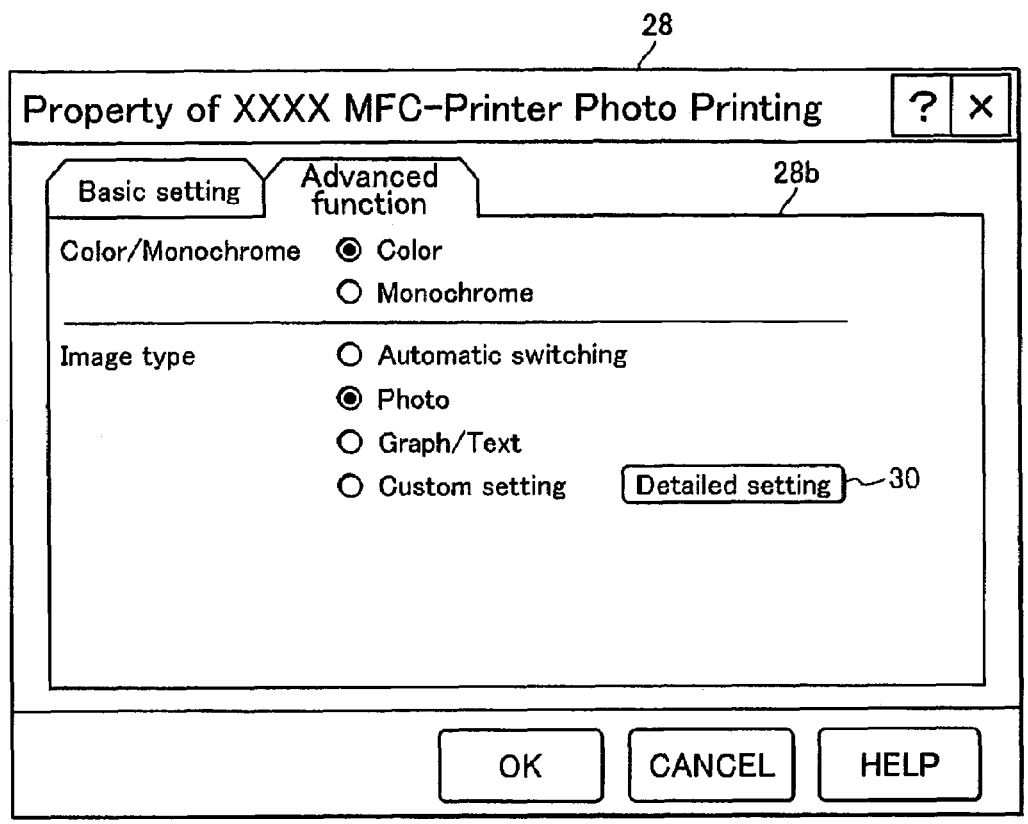
FIG. 9 is another view showing the property window of "XXXX MFC-Printer Photo printing"

In the virtual printer "XXXX MFC-Printer Photo printing" shown in Table 1, <Paper type> is set to "Gloss paper", <Print quality> is set to "Photo (2400 dpi)", <Paper size> is set to "L-size", and <Frameless printing> is set as shown in a basic setting tab window 28a of a property window 28 of FIG. 8, and <Image type> is set to "Photo" as shown in an advanced feature tab window 28b of the property window 28 of FIG. 9. Therefore, a name "XXXX MFC-Printer Photo printing" is assigned to the relevant virtual printer so that a user can grasp the setting concerning the print quality without opening the property window. Note that the other setting items are the same as those in the "XXXX MFC-Printer Default".

Similarly, also in each of the other virtual printers listed in Table 1, printing conditions that can be assumed from the name of the virtual printer are previously set. Note that the name or printing condition described in the painting condition setting data of each virtual printer listed in Table 1 can be changed according to need. For example, the name of the virtual printer can be changed on the directory (printer folder) that manages the virtual printer, and printing condition setting data can be changed on the property window of the virtual printer.

As shown in FIGS. 4, 6, and 8, a detailed setting button 29 is displayed in <Print quality> setting field of the basic setting tab window. The detailed setting button 29 is provided fox displaying detailed setting items concerning <Print quality>. When the detailed setting button 29 is selected by a mouse, a child dialogue box (not shown) on which detailed setting items concerning Print quality are provided pops up as a separated window More specifically, the three setting items <Bi-directional printing>, <Normal (fine) printing>, <Image emphasis> are displayed on the child dialogue box. The three setting items relate to the print quality and have a common attribute <Print quality>.

Further, a not shown detailed setting button is displayed in <Image emphasis> setting field of the child dialogue box. When the detailed setting button is selected, a child dialogue box (so-called "grandchild" dialogue box) on which <Color density>, <White balance>, <Sharpness>, <Automatic image processing>, <Brightness>, <Contrast>, <red>, <green>, and <blue> are provided as the setting items concerning <Image emphasis> is displayed. These setting items have a common attribute <Image emphasis>.

Further, as shown in FIGS. 5, 7, and 9, a detailed setting button 30 is displayed in <Image type> setting field of the advanced feature setting window. When the detailed setting button 30 is selected, a child dialogue box (not shown), on which the detailed setting items concerning <Image type>, such as <Adjust to monitor>, and <Color correction>, <Halftone> are provided, is displayed.

Figure 10:
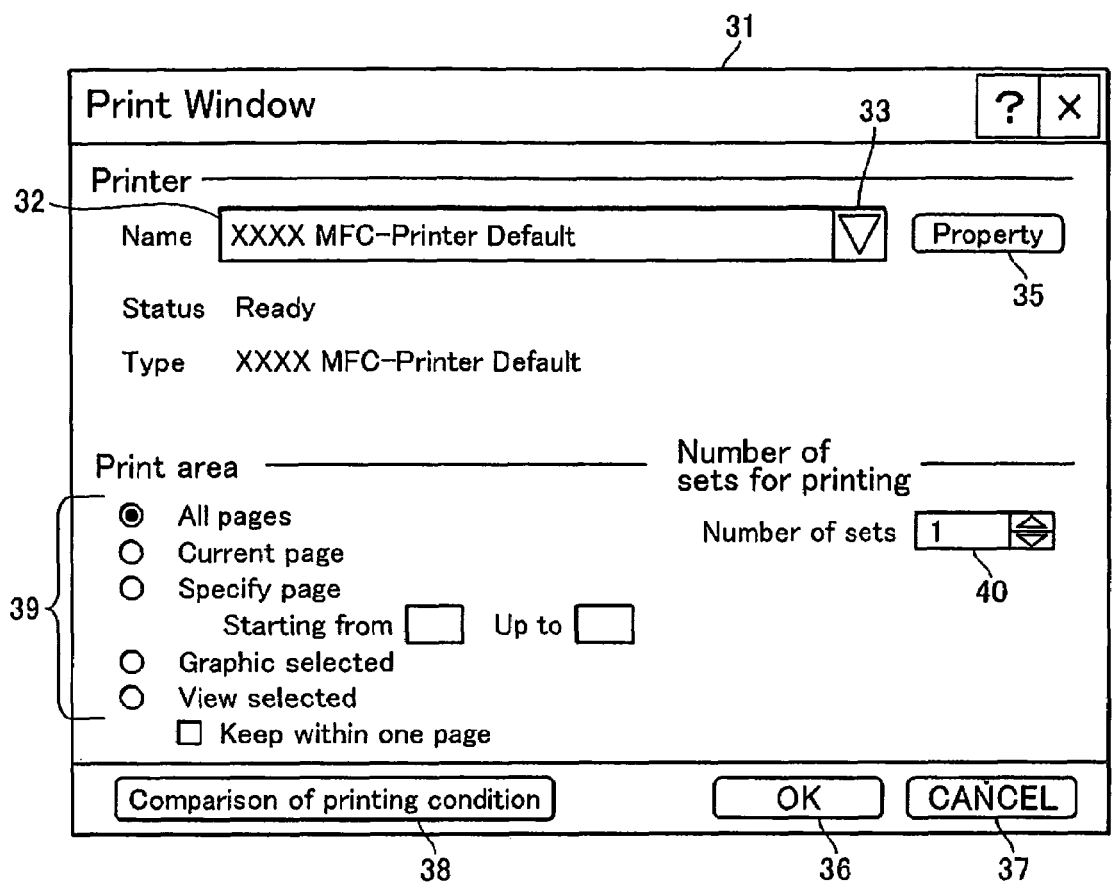
FIG. 10 is a view showing a print window.
Figure 11:
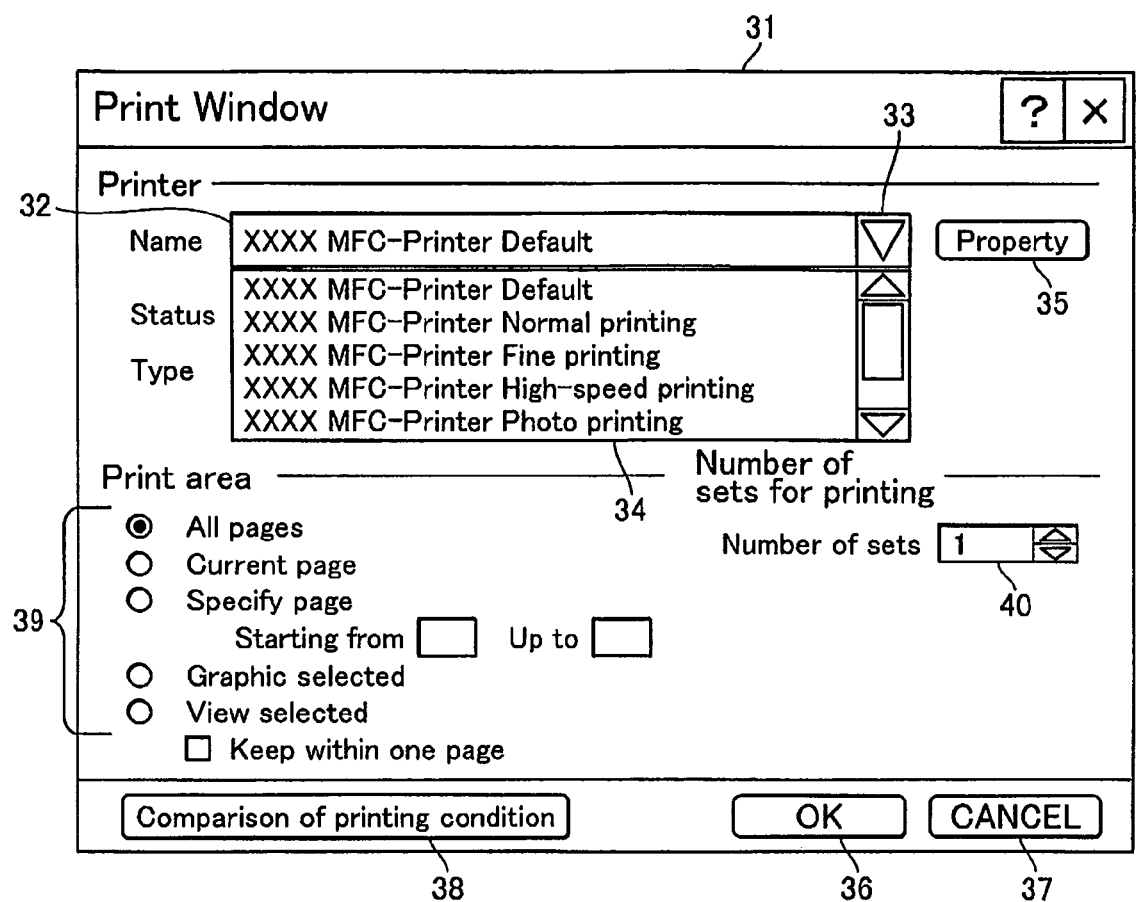
FIG. 11 is another view showing the print window.

Because the virtual printers (refer to Table 1) have been registered in the PC 1, in order to instruct printing from the PC 1, a print window 31 shown in FIGS. 10 and 11 is displayed by a GUI function of PC 1. On the print window 31, a virtual printer display area 32, various buttons such as a property button 35, an OK button 36, a cancel button 37, and a comparison button 38, a check box 39 for setting a print area, and a pull-down key 40 for setting the number of sets are appropriately arranged. The comparison button 38 named "Comparison of printing condition" is for activating the driver comparison tool to be described later.

When a mouse pointer is clicked on the pull-down key 33 arranged in the virtual printer display area 32, a scroll window 34 (refer to FIG. 11) on which the plurality of virtual printers shown in Table 1 are arranged in a selectable manner is displayed. A user can roughly grasp the settings of the printing condition from the names of the virtual printers arranged on the scroll window 34. When a desired virtual printer is selected from the scroll window 34, a set of printing condition setting data corresponding to the selected virtual printer is read out from the registry, and the read out printing condition setting data is reflected on a corresponding printer driver stored in the HDD 14. After that, when the OK button is depressed, the printer driver converts a document to be printed into printable print data in the printer unit 20, and the print data is transferred to the multifunction device 4. The cancel button 37 is for canceling printing operation, and the property button 35 is for displaying the property window (refer to FIGS. 4 to 9) of the virtual printer displayed on the virtual printer display area 32.

It is noted that even if the plurality of virtual printers listed in Table 1 are arranged on the scroll window 34, a user still has difficulty in completely grasping the contents of printing condition of the virtual printer from the name thereof. For example, when comparing "XXXX MFC-Printer Fine printing" and "XXXX MFC-Printer Photo printing", a user can know that a resolution differs between the two virtual printers from the names thereof. However, a user hardly grasps a difference of a setting value for each setting item such as <Number of sets>, <Paper size>, <Image emphasis>, <Frameless printing>, or <Layout>. In view of this, the PC 1 according to the present embodiment is provided with a function of comparing the printing conditions of two virtual printers arbitrarily selected by a user for each setting item and displaying the setting item, at which the printing conditions of the two virtual printers differ from each other, in a different manner from that of the other setting items, at which the printing conditions of the two virtual printers are the same as each other. When the comparison button 38 displayed on the print window 31 is depressed, the CPU 11 executes a predetermined processing according to the flowcharts (refer to FIGS. 12 to 22) to be described later to thereby attain the above-described function.

Hereinafter, the information processing executed by the CPU 11 will be described while referring to the flowcharts of FIGS. 12 to 22 and windows shown in FIGS. 23 to 28B. Each of S1, S2, . . . in the figures denotes a step number. The information processing is started at step S1.

First, in step S1, the CPU 11 determines whether the comparison button 38 (refer to FIG. 11) has been depressed. More specifically, the CPU 11 determines whether a mouse pointer is moved to the comparison button 38 and a click signal is generated on the comparison button 38.

When determining that the comparison button 38 has been depressed in S1, the CPU 11 reads out the software program of the driver comparison tool from the HDD 14 and activates the read out driver comparison tool (S2). After the driver comparison tool has been activated, the flow advances to step S3. The processing of step 3 and subsequent steps are executed under the control of the driver comparison tool.

Figure 13:
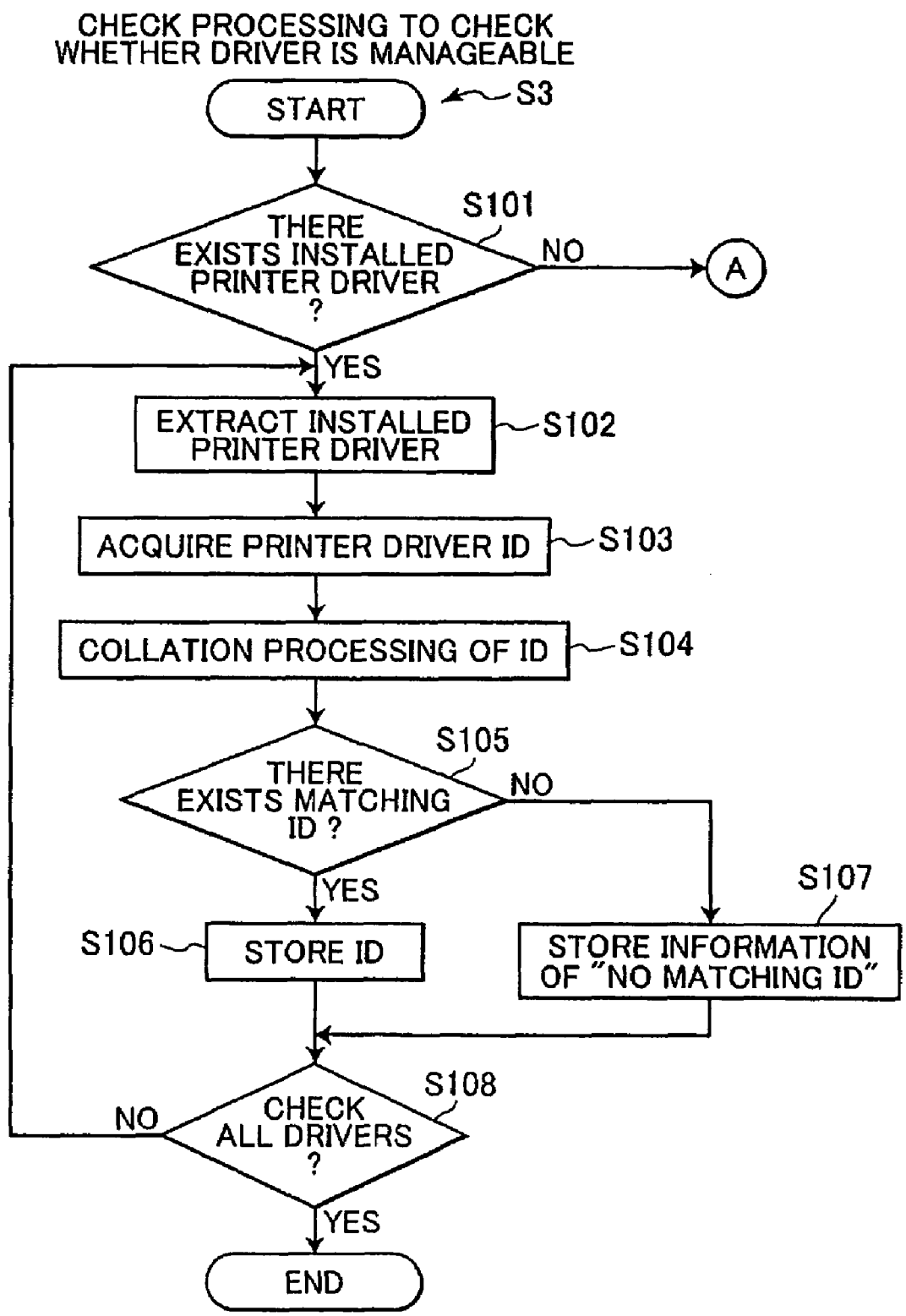
FIG. 13 is a flowchart of a procedure of checking is whether a driver is manageable in the flowchart of FIG. 12.

In step S3, a check processing to check whether a printer driver that has been installed on the PC 1 can be managed by the driver comparison tool is executed according to a procedure shown in the flowchart of FIG. 13.

The check processing is started at step S101.

In step S101, the CPU 11 determines whether there exists any printer driver that has been installed on the PC 1. This determination is made based on whether any printing condition setting data is stored in the registry, or based on whether any virtual printer is stored in a predetermined directory. In step S101, determination is made irrespective of the type of the printer driver installed. Accordingly, a printer driver that cannot be managed by the driver comparison tool is not excluded from the determination. When it is determined that no printer driver, has been installed (no in S101), the flow advances to step 512 shown in FIG. 12, where the driver comparison tool is ended. It is noted that when no printer driver has been installed, the driver comparison tool need not be executed in the first place. So, when it is determined, in step S101, that no printer driver has been installed, an error massage may be displayed before the termination of the driver comparison tool. This massage allows a user to recognize that he or she must install an adequate printer driver.

When it is determined, in step S101, that any printer driver has been installed (yes in S101), the installed printer driver is extracted (S102) and ID thereof is acquired (S103). More specifically, DEVMODE information included in the printer driver is read out and ID information is acquired from the DEVMODE information. The ID information is identifying the printer driver and is previously assigned for each printer driver. The DEVMODE information is indicating various settings of the printer driver. In the case where the DEVMODE information is stored in the registry together with the printing condition setting data, the DEVMODE information is read out from the registry and then the ID information is acquired therefrom.

In step S104, the CPU 11 executes collation processing to collate the acquired ID information. More specifically, a list of the IDs of printer drivers that can be managed by the driver comparison tool is previously stored in the HDD 14 or a register of the CPU 11. So, the CPU 11 performs a search to determine whether the ID information that has been acquired in step S103 is included in the ID list. This collation processing allows determination of whether the installed printer driver can be managed by the driver comparison tool.

When it is determined by the collation processing that there exists in the ID list some ID information that matches the ID information that has been acquired in step S103 (yes in S105), that is, the printer driver corresponding to the acquired ID information can be managed by the driver comparison tool, the flow advances to step S106, where the acquired ID information is stored in the RAM 13.

When it is determined that the ID information is not included in the ID list (no in S105), that is, the printer driver corresponding to the acquired ID information cannot be managed by the driver comparison tool, the acquired ID information is stored in the RAM 13 with "NULL" associated therewith (S107). Note that "NULL" is used as a programming language indicating that there is no value in the variable. In this case, "NULL" indicates that there is no matching ID.

After completion of the storage processing of step S106 or step S107, whether the check processing has been completed for all printer drivers that are installed in the PC1 is determined in step S108. When it is determined that the check processing has not yet been completed for all printer drivers (no in S108), step S102 and subsequent steps are executed once again. When the check processing has been completed for all printer drivers (yes in S108), the check processing is ended and the flow advances to step S4 in the flowchart of FIG. 12.

Figure 12:
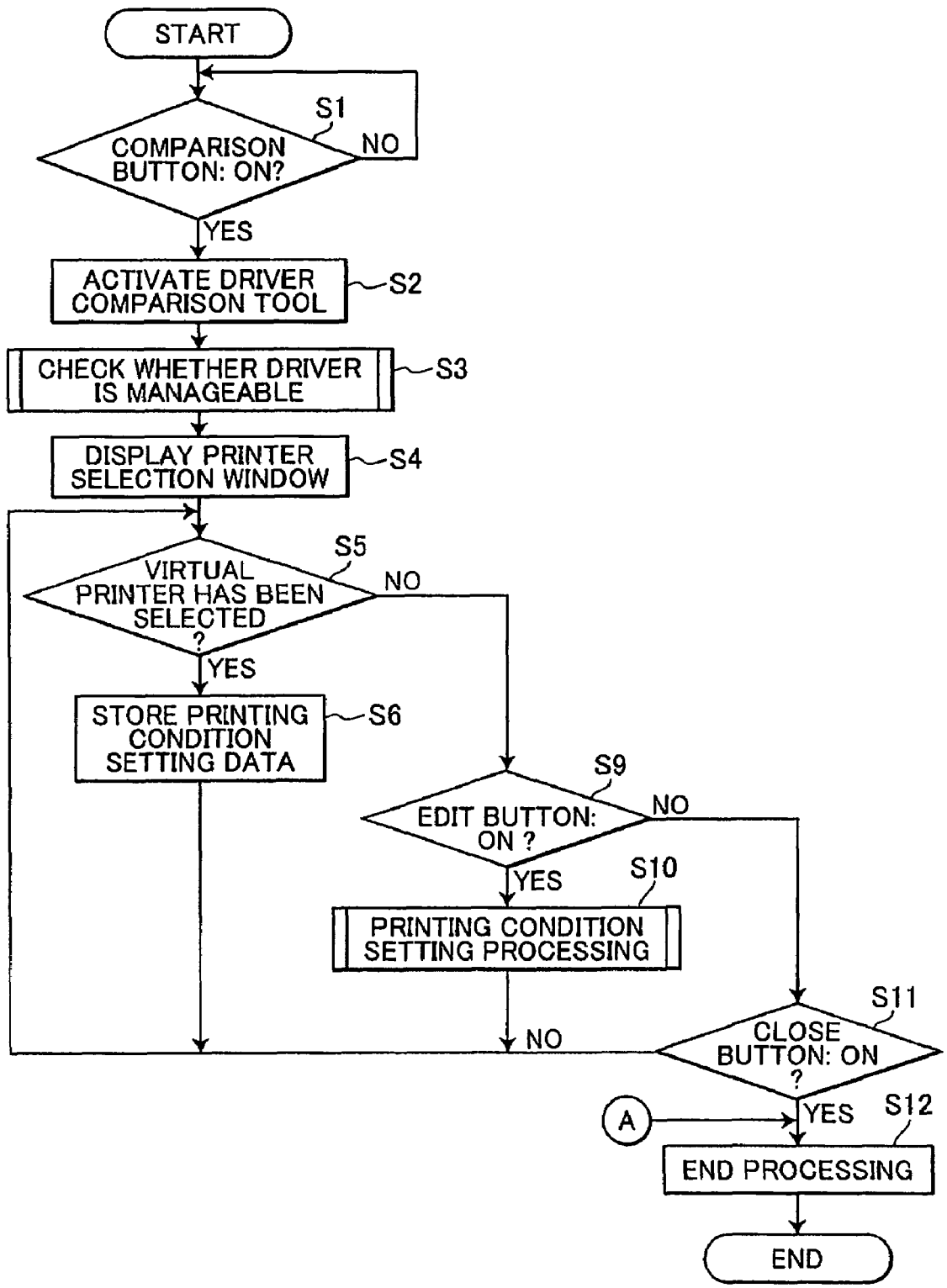
FIG. 12 is a flowchart of a procedure executed by a CPU in the PC of FIG. 2.
Figure 23:
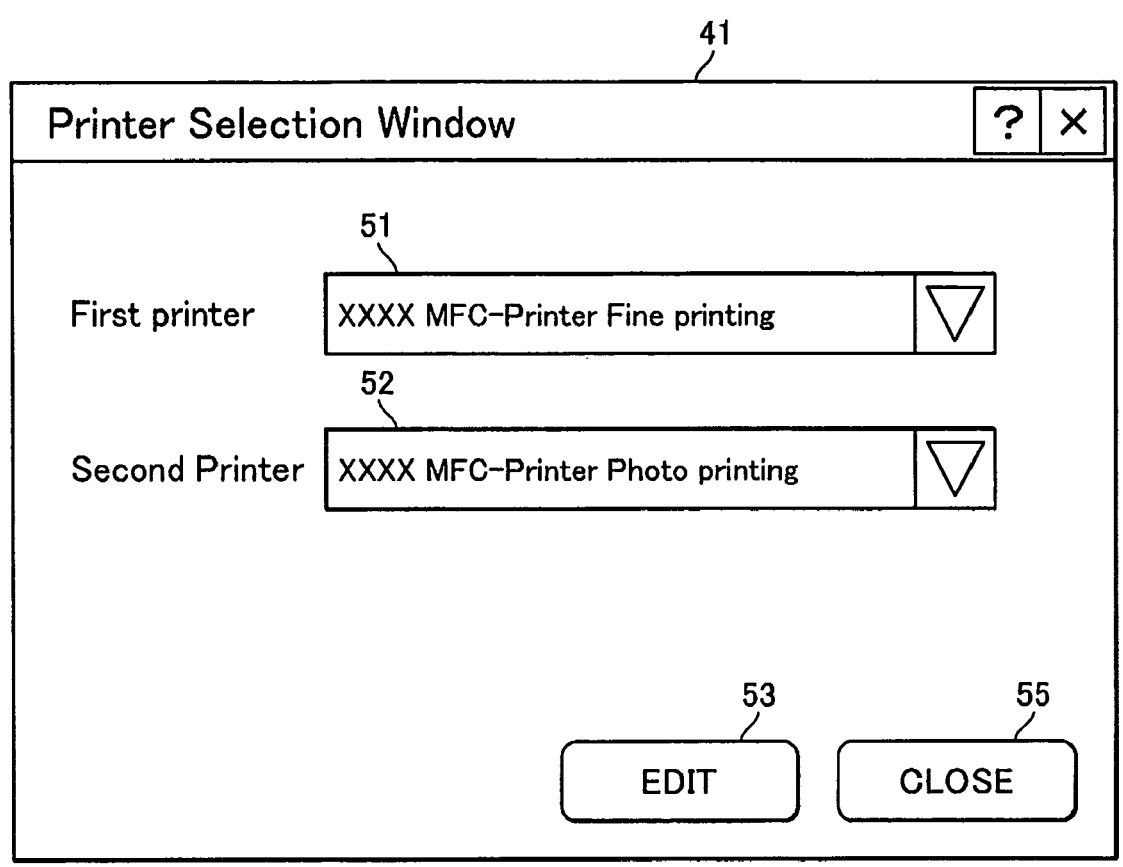
FIG. 23 is a view showing a printer selection window.
Figure 24:
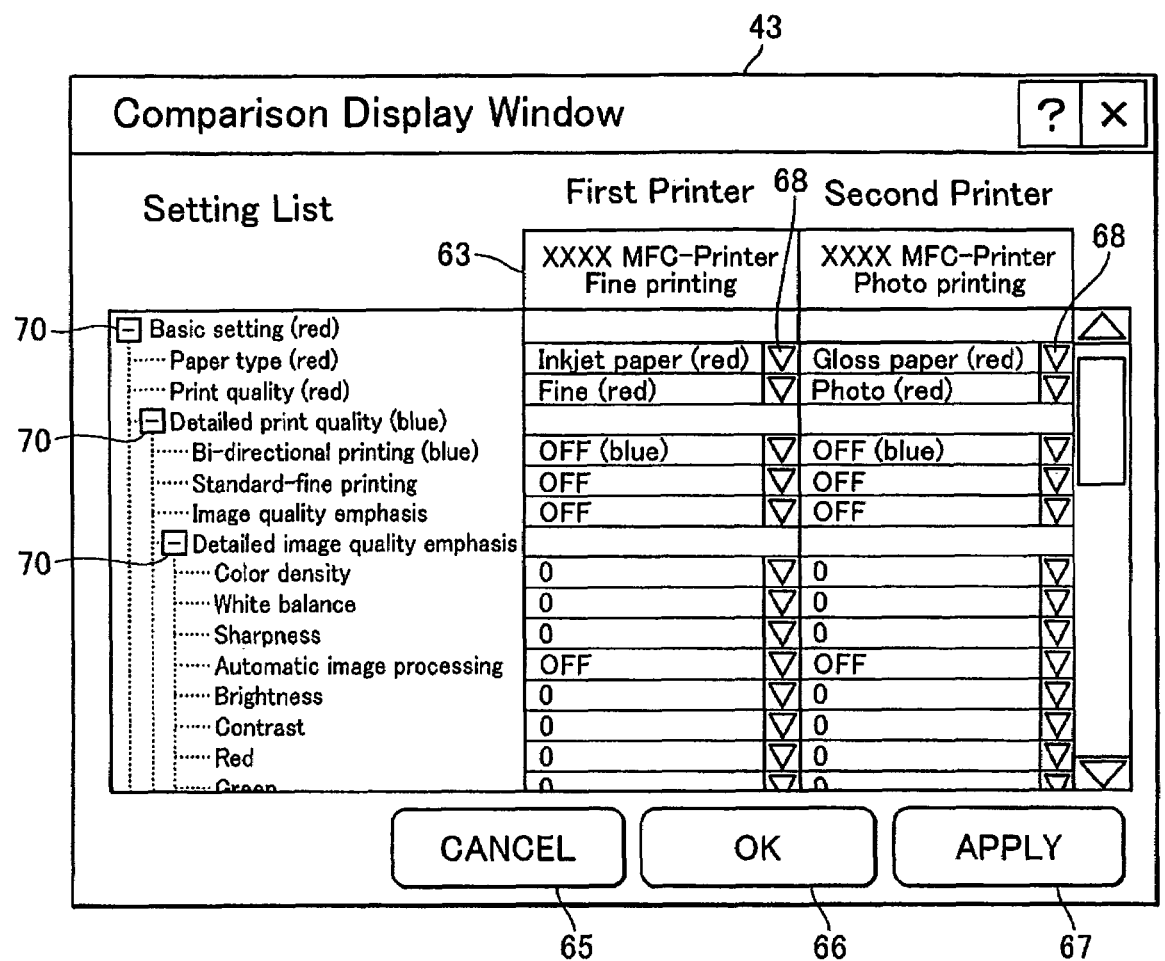
FIG. 24 is a view showing a part of an example of a comparison display window.
Figure 25:
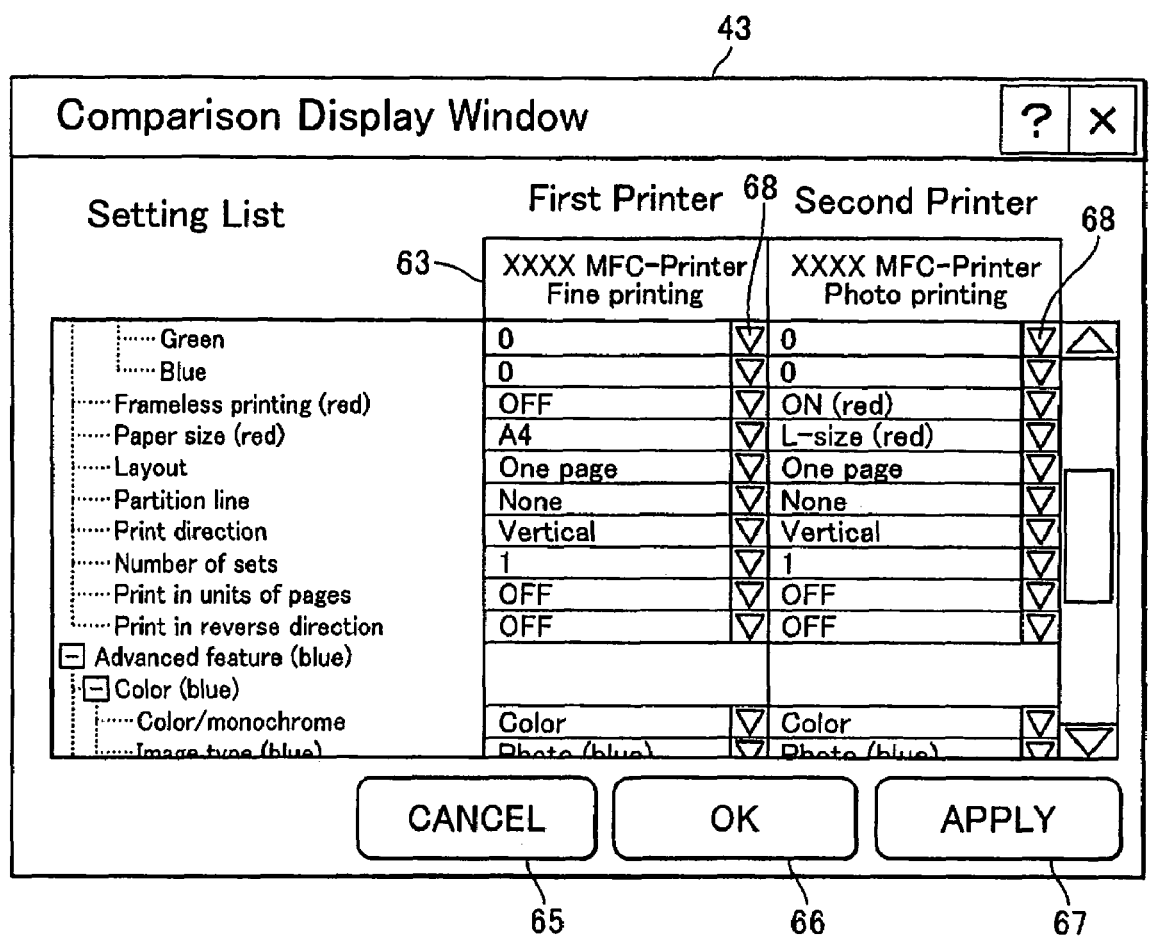
FIG. 25 is a view showing another part of the example of the comparison display window.
Figure 26:
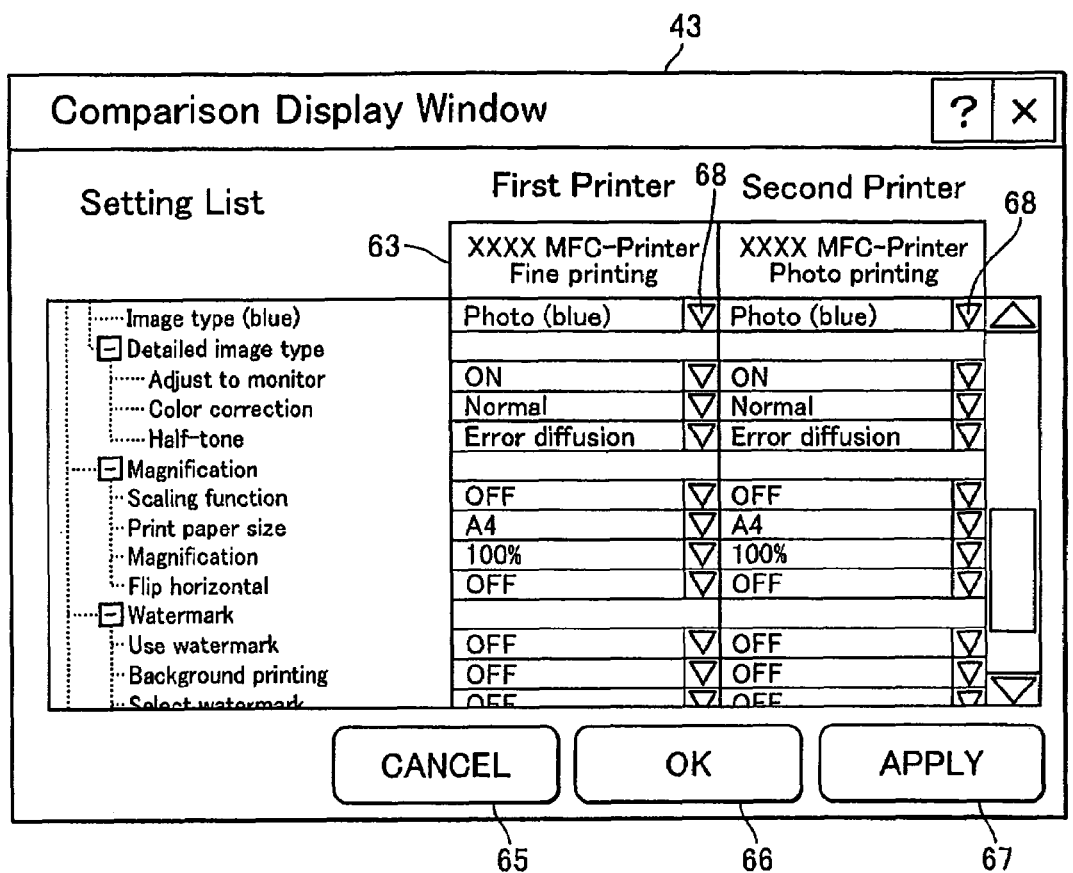
FIG. 26 is a view showing a remaining part of the example of the comparison display window.

In step S4 of FIG. 12, a printer selection window 41 shown in FIG. 23 serving as a user interface window is displayed on the display section 15. Specifically, data of the printer selection window 41 generated by a GUI function is output to the display section 15 by the CPU 11 to display the printer selection window 41 on the display section 15. Windows shown in FIGS. 24 to 28B are also user interface windows displayed by the GUI function of the PC 1.

Virtual printer display areas 51 and 52 similar to the virtual printer display area 32 on the print window 31 (refer to FIG. 10) are arranged vertically on the printer selection window 41. The names of the plurality of virtual printers listed in Table 1 are selectably displayed on a pull-down menu of the virtual printer display areas 51 and 52. Thus, a user can select a desirable virtual printer from the pull-down menu of the virtual printer display areas 51 and 52. Hereinafter, as a matter of convenience, a virtual printer selected in the upper virtual printer display area 51 is referred to as "first printer", and a virtual printer selected in the lower virtual printer display area 52 is referred to as "second printer". In the present embodiment, the printing conditions of the thus selected two virtual printers are compared for each setting item.

It is noted that the printing conditions may be compared among three or more virtual printers by proving three or more virtual printer display areas on the printer selection window 41. Note that an item marked "Additional printer" (not shown) can be selected in the virtual printer display area 52. A case where the "Additional printer" is selected will be described later.

An edit button 53 and a close button 55 are appropriately arranged on the printer selection window 41. When the edit button 53 is depressed, the printer selection window 41 is changed to a comparison display window 43 shown in FIGS. 24 to 27. When the close button 55 is depressed, the printer selection window 41 is closed and the print window 31 shown in FIGS. 10-11 appears.

When virtual painters (including "Additional printer") are selected in the virtual printer display areas 51 and 52, (Yes in S5), printing condition setting data corresponding to the selected first and second printers are read out from the registry by the CPU 11 and stored in the RAM 13 (S6). That is, the printing condition setting data corresponding to the first and second printers is extracted from the plurality of sets of printing condition setting data stored in the registry. The selection of the first and second printers is thus completed.

FIG. 23 shows an example in which a virtual printer named "XXXX MFC-Printer Fine printing" is selected in the virtual printer display area 51 as the first printer and a virtual printer named "XXXX MFC-Printer Photo printing" is selected in the virtual printer display area 52 as the second printer. In the following description, the printing conditions of the first printer "XXXX MFC-Printer Fine printing" and second printer "XXXX MFC-Printer Photo printing" axe compared with each other fox each setting item.

In step S9, whether the edit button 53 has been depressed on the printer selection window 41 is determined. When it is determined that the edit button 53 has been depressed (yes in S9), the flow advances to step S10, where a printing condition setting processing is executed. If the edit button 53 is not depressed but the close button 55 is depressed in step S11 (No in S9 and Yes in S11), the driver comparison tool is ended in step S12. Although a loop is formed from steps S5 to S11 in FIG. 12, the processing from steps S5 to S6 and the processing from steps S9 to S10 are independent processings that are executed when corresponding operations are made on the printer selection window 41.

Next, the procedure of the printing condition setting processing of step S10 will be described with reference to the flowchart of FIG. 14.

The printing condition setting processing is started at step S201.

In step S201, whether "Additional printer" has been selected in the virtual printer display area 52 on the printer selection window 41 is determined. When it is determined that "Additional printer" has been selected (yes in S201), the flow advances to step S202. When it is determined that "Additional printer" has not been selected but any of the virtual printers listed in Table 1 has been selected as the second printer (no in S201), the flow advances to step S205.

In step S202, the default printing condition setting data is installed in the registry. In practice, the default printing condition setting data is copied and stored in the registry with the name thereof changed so as to be identifiable to a user. At this time, a virtual printer associated with the installed printing condition setting data is newly registered in the directory. After that, in step S203, the name of the newly registered virtual printer is changed. The name of the virtual printer may automatically be changed by the CPU 11 or may be changed to a name that a user has input on the input section 16. Then, in step S204, the printing condition described in the printing condition setting data of the virtual printer to which the new name is assigned is changed to the same contents as those of the printing condition of the selected first printer displayed in the virtual printer display area 51. After that, the flow advances to step S205. After the processing of steps S202 to S204, the virtual printer having the same printing condition as that of the first printer and having a different name from that of the first printer is set as the second printer. It is noted that the second printer may be installed by copying the printing condition setting data of the first printer and storing the data in the registry with the name different from that of the first printer assigned.

In step S205, the CPU 11 executes a setting list display processing to compare the printing conditions of the first and second printers with each other for each setting item and to display, on the display section 15, the setting item for which the printing conditions of the two printers differ from each other in a different manner as that of other setting items for which the printing conditions of the two printers are the same with each other.

Specifically, as shown in FIGS. 24 to 27, a comparison display window 43 including a setting list 63 is displayed on the display section 15. The setting list 63 is a list of the setting items of the printing conditions of the first and second printers selected on the printer selection window 41. On the setting list 63, setting items are hierarchically displayed in a tree structure. Setting values of the first and second printers are displayed in correspondence with the setting items. The setting list 63 is thus displayed on the display section 15, so that a user can easily recognize a difference in the printing condition for each setting item between the first and second printers at first sight. FIGS. 24 to 27 show an example of the setting list in the case where two virtual printers "XXXX MFC-Printer Fine printing" and "XXXX MFC-Printer Photo printing" are selected. The details of the setting list display processing in step S205 will be described later.

An open/close mark 70 is provided on the left side of each title setting item that has at least one lower setting item relative thereto and therefore that has no setting value in direct correspondence therewith.

Figure 27:
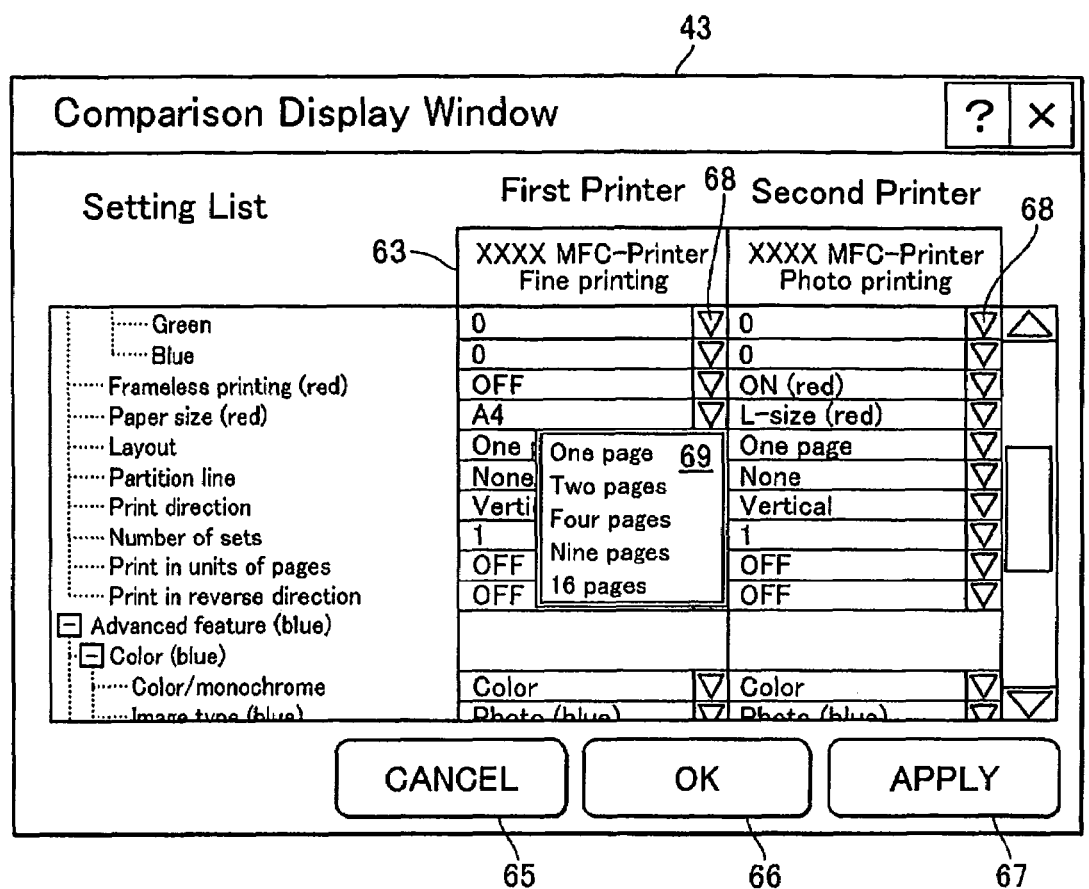
FIG. 27 is a view showing an example of a part of the comparison display window.

A cancel button 65, an OK button 66, and an apply button 67 are arranged on the comparison display window 43. In the present embodiment, the printing condition can be changed on the comparison display window 43. Therefore, on the setting list 63, a pull-down key 68 is provided for each setting field of the setting item. When a mouse pointer is moved to the pull-down key 68 on the comparison display window 43 and the pull down key 68 is selected by the mouse operation, a pull-down menu 69 is displayed as shown in FIG. 27. Although FIG. 27 shows the pull-down menu 69 of Layout of the first printer, the same pull-down menu can be displayed for other setting items of the first printer as well as setting items of the second printer.

When the pull-down menu 69 is displayed and the CPU 11 determines that a desired setting value has been selected from the pull-down menu 69 (Yes in S206), the pull-down menu is closed and the selected value is displayed on the setting list 63. Then, printing condition including the selected value is temporarily stored in the RAM 13 (S207). After that, the flow advances to step S208. On the other hand, when no setting value has been selected (No in S206), the pull-down menu is closed and the current printing condition is displayed on the setting list 63.

After the user's approved setting value is thus displayed on the setting list 63, whether the apply button 67 has been depressed is determined in step S208. When it is determined in step S208 that the apply button 67 has been depressed (yes in S208), the printing conditions of the first and second printers are changed to the contents displayed on the setting list 63 (S209). Specifically, the printing condition setting data corresponding respectively to the first and second printers are updated with the contents displayed on the setting list 63. After that, the flow returns to step S206.

When the apply button 67 has not been depressed but the cancel button 65 has been depressed (No in S208 and Yes in S210), the changed display contents of the setting list 63 are set back to the original contents (S211). When the apply button 67 and cancel button 65 have not been depressed but the OK button 66 has been depressed (Yes in S212), the printing conditions of the first and second printers are changed to the contents displayed on the setting list 63 (S213) as in the case of step S209. After that, the current window is switched to the printer selection window 41 of FIG. 23 (S214), and the printing condition setting processing of S101 is ended. Note that a loop is formed from steps S206 to S212 and this loop is repeated until "Yes" is determined in step S210 or step S212.

As described above, in the present embodiment, not only that the printing conditions of the selected two virtual printers are displayed in a comparative manner, but also that the printing conditions can be changed on the comparison display window 4.3 without individually displaying property windows, thereby improving the user's operability.

Figure 15:
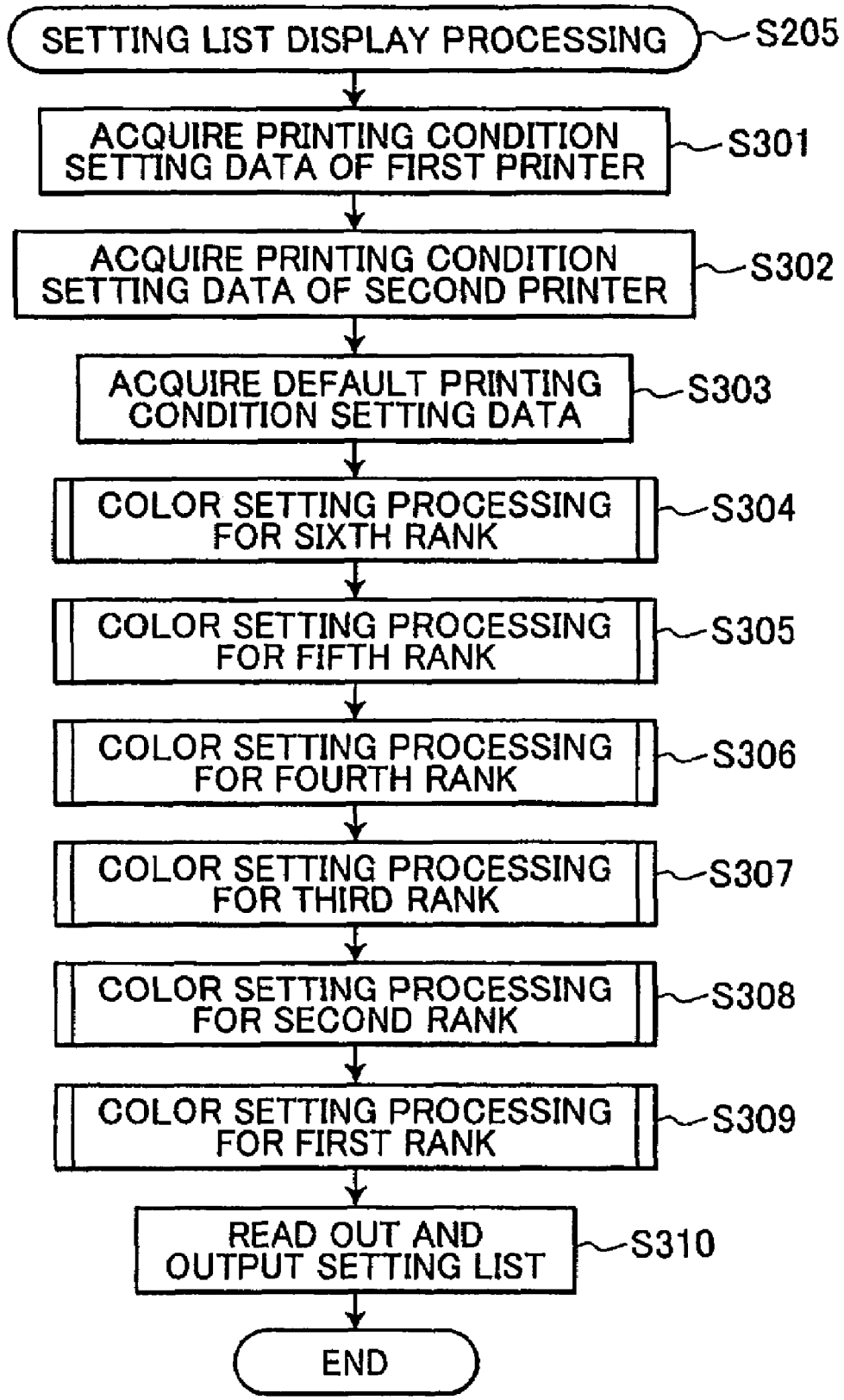
FIG. 15 is a flowchart of a setting List display processing in the flowchart of FIG. 14.

Next, the procedure of the setting list display processing of step S205 will be described with reference to the flowchart of FIG. 15.

It is noted that in the setting list display processing of step S205, display modes are determined for all the setting items and all the setting values for the printing conditions of the first and second printers. The display mode is a setting mode for setting a display color of each of the setting items and the setting values to black, blue, or red. A mode for display in black color is referred to as "black mode", mode for display in blue color is referred to as "blue mode", and mode for display in red color is referred to as "red mode". The display mode of the setting item is determined by comparing, for each setting item, the setting values in the printing condition setting data acquired in steps S301 to S303. The details will be described later.

The setting list display processing of S205 is started at step S301.

In step S301, the printing condition setting data of the first printer is acquired. Specifically, the CPU 11 reads out the printing condition setting data associated with the first printer from the registry.

Similarly, in step S302, the printing condition setting data of the second printer is acquired. In this example, "XXXX MFC-Printer Fine printing" and "XXXX MFC-Printer Photo printing" are selected as the first and second printers as shown in the printer selection window 41 of FIG. 23. So, the printing condition setting data corresponding respectively to "XXXX MFC-Printer Fine printing" and "XXXX MFC-Printer Photo printing" are acquired.

Similarly, in step S303, the printing condition setting data corresponding to "XXXX MFC-Printer Default" is acquired. The virtual printer "XXXX MFC-Printer Default" will be referred to as "default printer" hereinafter.

Next, in step S304, the CPU 11 executes a color setting processing for the setting items in the sixth (lowest) rank.

Next, in step S305, the CPU 11 executes a color setting processing for the setting items in the fifth rank Next, in step S306, the CPU 11 executes a color setting processing for the setting items in the fourth rank.

Next, in step S307, the CPU 11 executes a color setting processing for the setting items in the third rank.

Next, in step S308, the CPU 11 executes a color setting processing for the setting items in the second tank.

Next, in step S309, the CPU 11 executes a color setting processing for the setting items in the first rank.

Thus, through steps S304-S309, the setting list 63 is generated to display all the setting values and all the setting items for the first and second printers in the determined colors, and data of the setting list 63 is stored in the RAM 13.

Next, in S310, the setting list 63 stored in the RAM 13 is read out and the comparison display window 43 (refer to FIGS. 24 to 27) including the read out setting list 63 is displayed on the display section 15. Next will be described with reference to FIG. 16A the color setting processing for the setting items in the sixth (lowest) rank.

When the color setting processing for the setting items in the sixth (lowest) rank is started, first, in S400, the CPU 11 selects one setting item (first setting item) among all the setting items <font type>, <style>, <size>, <strike through>, <underline>, <color>, and <character set> that are located in the sixth rank as shown in Tables 2 and 3. Next, the CPU 11 performs a first display mode setting process in S402 to set a display mode (color) for the selected setting item and to set display modes (colors) for the setting values of the first and second printers for the selected setting item. Next, in S404, the CPU 11 judges whether or not display modes (colors)

have been determined for all the setting items in the sixth rank. When display modes (colors) have not yet been determined for all the setting items in the sixth rank (no in S404), the process goes to S406 wherein the CPU 11 selects another sixth-rank setting item whose display mode (color) has not yet been set, and the process returns to S402. On the other hand, when display modes (colors) have been determined for all the setting items in the sixth rank (yes in S404), the color setting processing of S304 for the setting items in the sixth (lowest) rank is completed.

Figure 20:
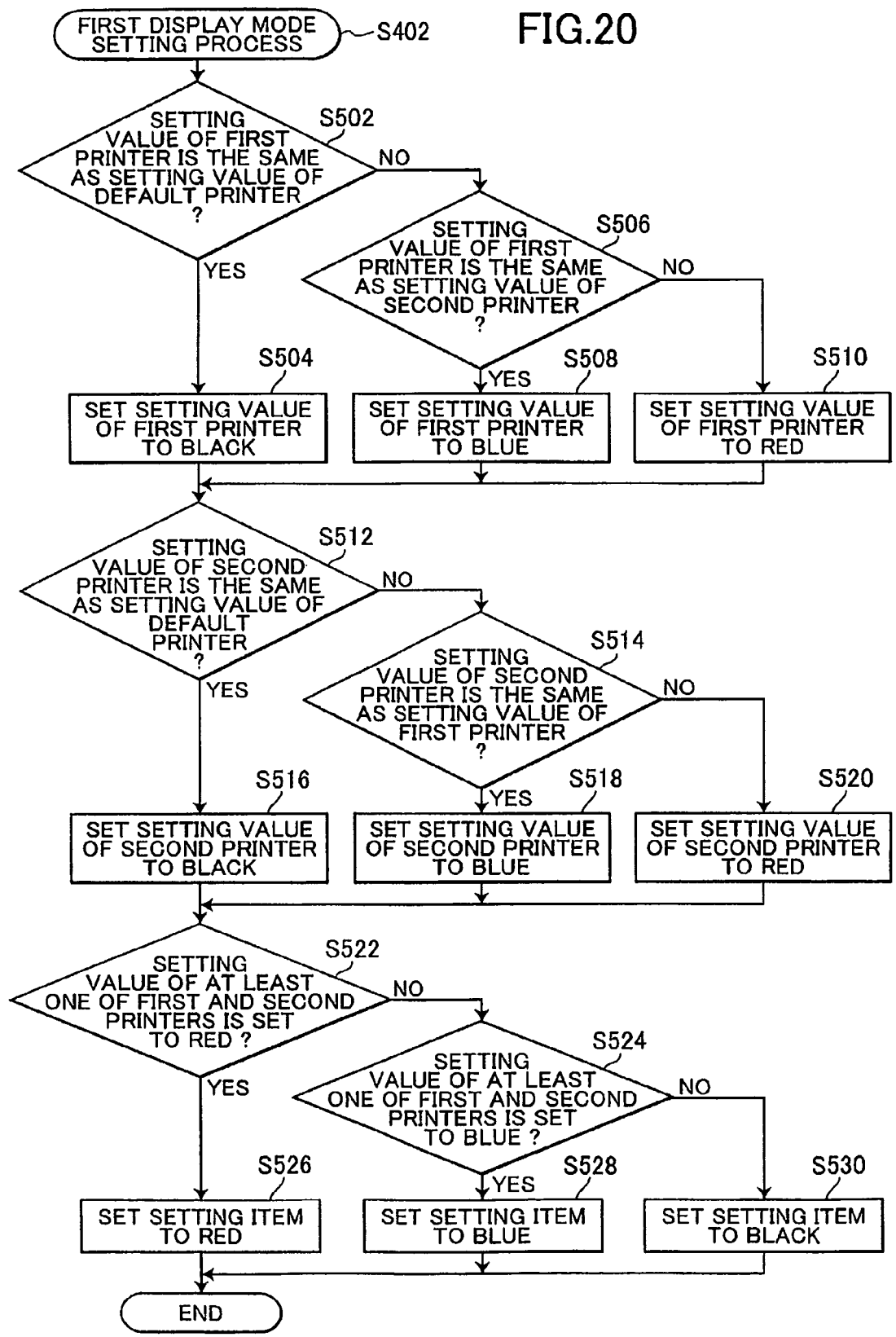
FIG. 20 is a flowchart of a first display mode setting process in the flowchart of FIG. 16A.

Next will be described, with reference to FIG. 20, the first display mode setting process of S402.

In the first display mode setting process, first in S502, the CPU 11 judges, for the selected setting item, whether or not the setting value of the first printer is the same as the setting value of the default printer. When the setting value of the first printer is the same as the setting value of the default printer (yes in S502), the display mode of the setting value of the first printer for the selected item is set to black in S504. On the other hand, when the setting value of the first printer is different from the setting value of the default printer (no in S502), the CPU 11 further judges, for the selected setting item, whether or not the setting value of the first printer is the same as the setting value of the second printer in S506 When the setting value of the first printer is the same as the setting value of the second printer (yes in S506), the display mode of the setting value of the first printer for the selected setting item is set to blue in S508. On the other hand, when the setting value of the first printer is different from the setting value of the second printer (no in S506), the display mode of the setting value of the first printer for the selected setting item is set to red in S510.

After the display mode has been set for the setting value of the first printer for the selected setting item in S504, S508, or S510, the process goes to S512. In S512, the CPU 11 further judges, for the selected setting item, whether or not the setting value of the second printer is the same as the setting value of the default printer. When the setting value of the second printer is the same as the setting value of the default printer (yes in S512), the display mode of the setting value of the second printer for the selected item is set to black in S516. On the other hand, when the setting value of the second printer is different from the setting value of the default printer (no in S512), the CPU 11 further judges, for the selected setting item, whether or not the setting value of the second printer is the same as the setting value of the first printer in S514. When the setting value of the second printer is the same as the setting value of the first printer (yes in S514), the display mode of the setting value of the second printer for the selected setting item is set to blue in S518. On the other hand, when the setting value of the second printer is different from the setting value of the first printer (no in S514), the display mode of the setting value of the second printer for the selected setting item is set to red in S520.

After the display mode has been set for the setting value of the second printer for the selected setting item in S516, S518, or S520, the process goes to S522. In S522, the CPU 11 further judges, for the selected setting item, whether or not at least one of the setting values of the first and second printers is set to red. When at least one of the setting values of the first and second printers is set to red (yes in S522), the CPU 11 sets the display mode of the selected setting item to red in S526. On the other hand, when any of the setting values of the first and second printers are not set to red (no in S522), the CPU 11 further judges, for the selected setting item, whether or not at least one of the setting values of the first and second printers is set to blue in S524 When at least one of the setting values of the first and second printers is set to blue (yes in S524), the CPU 11 sets the display mode of the selected setting item to blue in S528. On the other hand, when any of the setting values of the first and second printers are not set to blue (no in S524), the CPU 11 sets the display mode of the selected setting item to black in s530. After executing the process of S526, S528, or S530, the first display mode setting process of S404 ends.

Figure 16A:
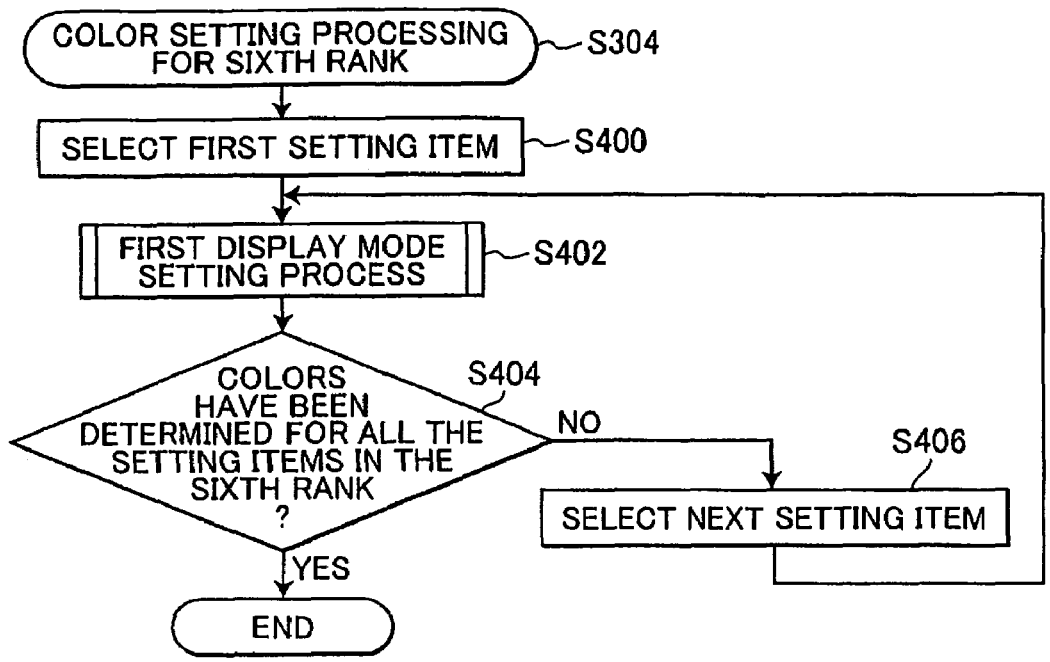
FIG. 16A is a flowchart of a color setting processing for the sixth (lowest) rank in the flowchart of FIG. 15.
Figure 16B:
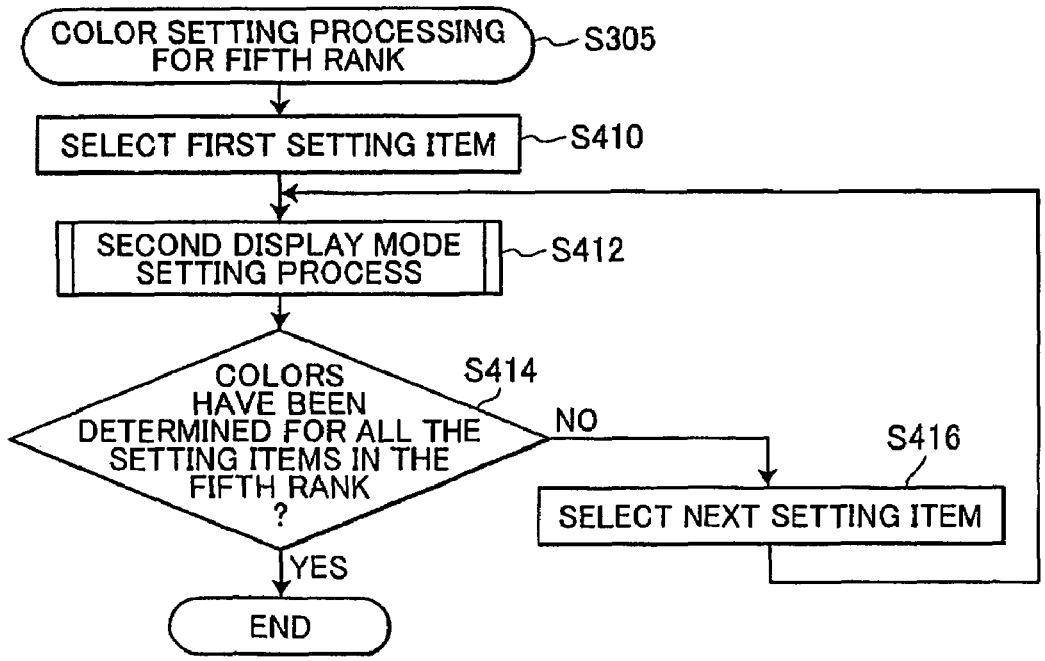
FIG. 16B is a flowchart of a color setting processing for the fifth rank in the flowchart of FIG. 15.

Next, the color setting processing for the setting items in the fifth rank of S305 will be described with reference to FIG. 16B.

When the color setting processing for the setting items in the fifth rank is started, first, in S410, the CPU 11 selects one setting item (first setting item) among all the fifth-rank setting items.

Next, the CPU 11 performs a second display mode setting process in S412 to set a display mode (color) for the selected setting item. It is noted that in S412, the CPU 11 further sets display modes (colors) for the setting values of the first and second printers for the selected setting item if the setting values exist: in direct correspondence with the selected setting item. In other words, in S412, the CPU 11 sets a display mode (color) for the selected setting item if the selected item 15 a title setting item. The CPU 11 sets a display mode (color) for the selected setting item and further sets display modes (colors) for the setting values of the first and second printers for the selected setting item if the selected setting item is not a title setting item.

Next, in S414, the CPU 11 judges whether or not display modes (colors) have been determined for all the setting items in the fifth rank. When display modes (colors) have not yet been determined for all the setting items in the fifth rank (no in S414), the process goes to S416 wherein the CPU 11 selects another fifth-rank setting item whose display mode (color) has not yet been set, and the process returns to S412. On the other hand, when display modes (colors) have been determined for all the setting items in the fifth rank (yes in S414), the color setting processing of S306 for the setting items in the fifth rank is completed.

Next will be described, with reference to FIG. 21, the second display mode setting process of S412.

In the second display mode setting process, first in S602, the CPU 11 judges whether or not the selected setting item has at least one lower rank setting item of its own. That is, the CPU 11 judges whether or not there is at least one lower-rank setting item relative to the selected setting item. Thus, in S602, the CPU 11 judges whether or not the selected setting item is a title setting item. When the selected setting item has no lower rank setting item of its own (no in S602), it is known that the selected setting item is not a title setting item and therefore that there exist setting values of the first and second printers in direct correspondence with the selected setting item. So, the CPU 11 executes the first display mode setting process in S614 for the selected setting item in the same manner as in S402.

On the other hand, when the selected setting item has at least one lower rank setting item of its own (yes in S602), it is known that the selected setting item is a title setting item and therefore that there exist no setting values of the first and second printers in direct correspondence with the selected setting item. So, the CPU 11 judges in S604 whether or not at least one of the lower rank setting item is set in red. When at least one of the lower rank setting item is set in red (yes in S604), the selected setting item is set to red in S608. On the other hand, when the selected setting item has no lower rank setting item that is set in red (no in S604), the CPU 11 judges in S606 whether or not at least one of the lower rank setting item is set in blue. When at least one of the lower rank setting item is set in blue (yes in S606), the selected setting item is set to blue in S610. On the other hand, when the selected setting item has no lower rank setting item that is set in blue (no in S606), the selected setting item is set to black in S612 After executing the process of S608, S610, S612, or S614, the second display mode setting process of S412 ends.

Figure 16C:
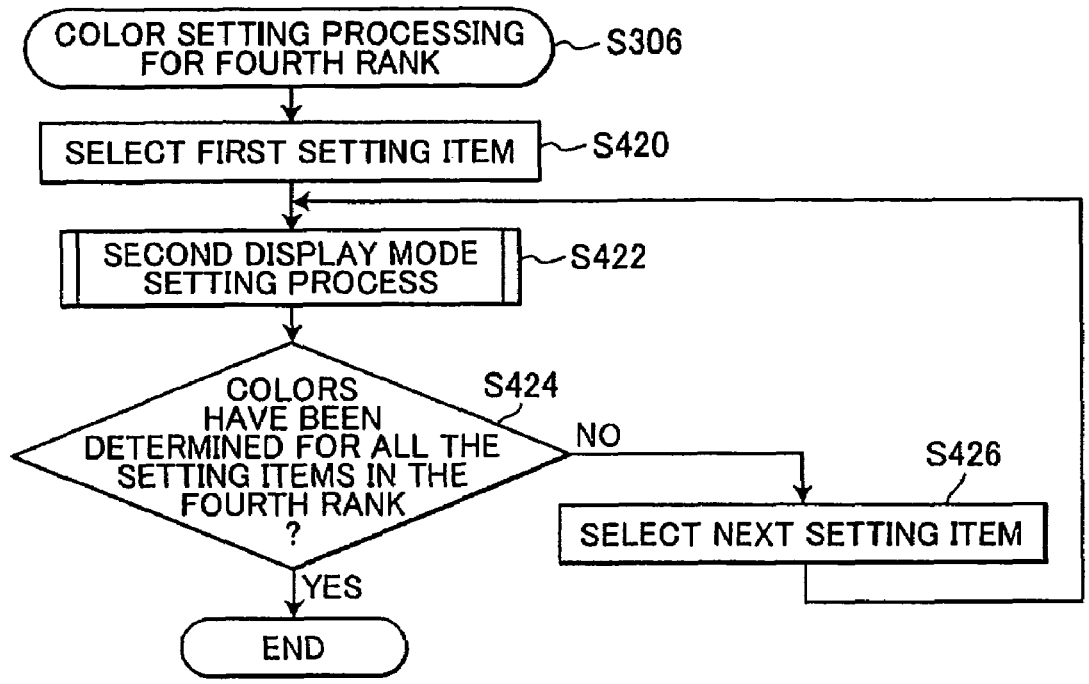
FIG. 16C is a flowchart of a color setting processing for the fourth rank in the flowchart of FIG. 15.

Next, the color setting processing for the setting items in the fourth rank of S306 will be described with reference to FIG. 16C.

When the color setting processing for the setting items in the fourth rank is started, first, in S420, the CPU 11 selects one setting item (first setting item) among all the fourth-rank setting items. Next, the CPU 11 performs in S422 the second display mode setting process of FIG. 21 to set a display mode (color) for the selected setting item. It is noted that in S422, the CPU 11 further sets display modes (colors) for setting values of the first and second printers for the selected setting item if the setting values exist in direct correspondence with the selected setting item. Next, in S424, the CPU 11 judges whether or not display modes (colors) have been determined for all the setting items in the fourth rank. When display modes (colors) have not yet been determined for all the setting items in the fourth rank (no in S424), the process goes to S426 wherein the CPU 11 selects another fourth-rank setting item whose display mode (color) has not yet been set, and the process returns to S422. On the other hand, when display modes (colors) have been determined for all the setting items in the fourth rank (yes in S424), the color setting processing of S306 for the setting items in the fourth rank is completed.

Figure 17:
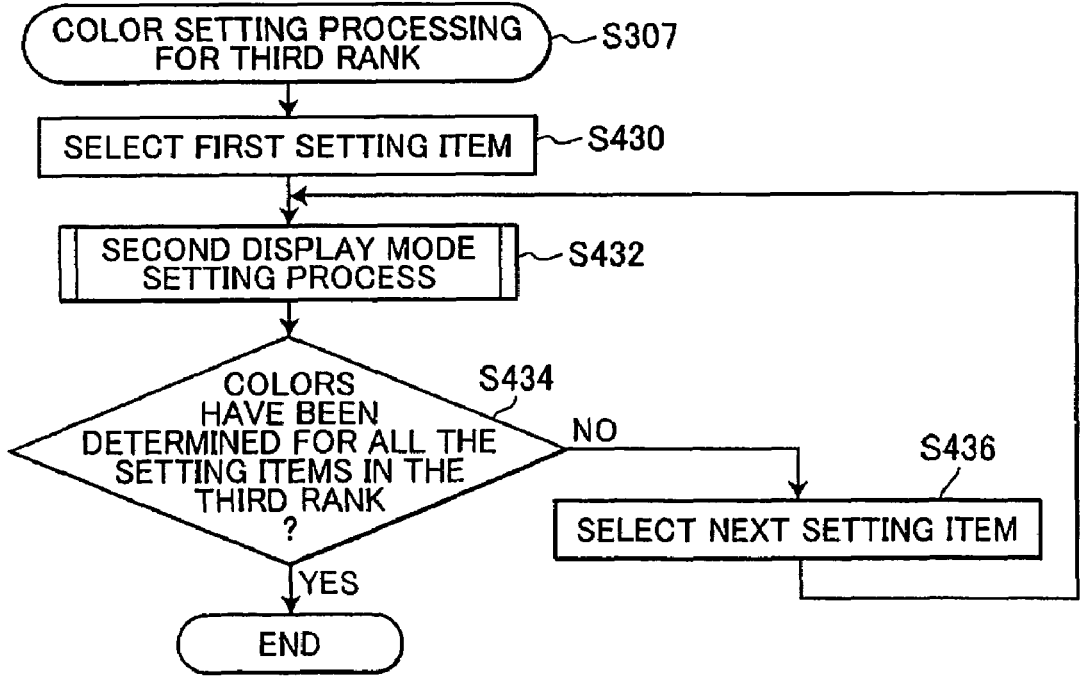
FIG. 17 is a flowchart of a color setting processing for the third rank in the flowchart of FIG. 15.

Next, the color setting processing for the setting items in the third rank of S307 will be described with reference to FIG. 17.

When the color setting processing for the setting items in the third rank is started, first, in S430, the CPU 11 selects one setting item (first setting item) among all the third-rank setting items. Next, the CPU 11 performs in S432 the second display mode setting process of FIG. 21 to set a display mode (color) for the selected setting item. It is noted that in S432, the CPU 11 further sets display modes (colors) for setting values of the first and second printers for the selected setting item if the setting values exist in direct correspondence with the selected setting item. Next, in S434, the CPU 11 judges whether or not display modes (colors) have been determined for all the setting items in the third rank. When display modes (colors) have not yet been determined for all the setting items in the third rank (no in S434), the process goes to S436 wherein the CPU 11 selects another third-rank setting item whose display mode (color) has not yet been set, and the process returns to S432. On the other hand, when display modes (colors) have been determined for all the setting items in the third rank (yes in S434), the color setting processing of S307 fox the setting items in the third rank is completed.

Figure 18:
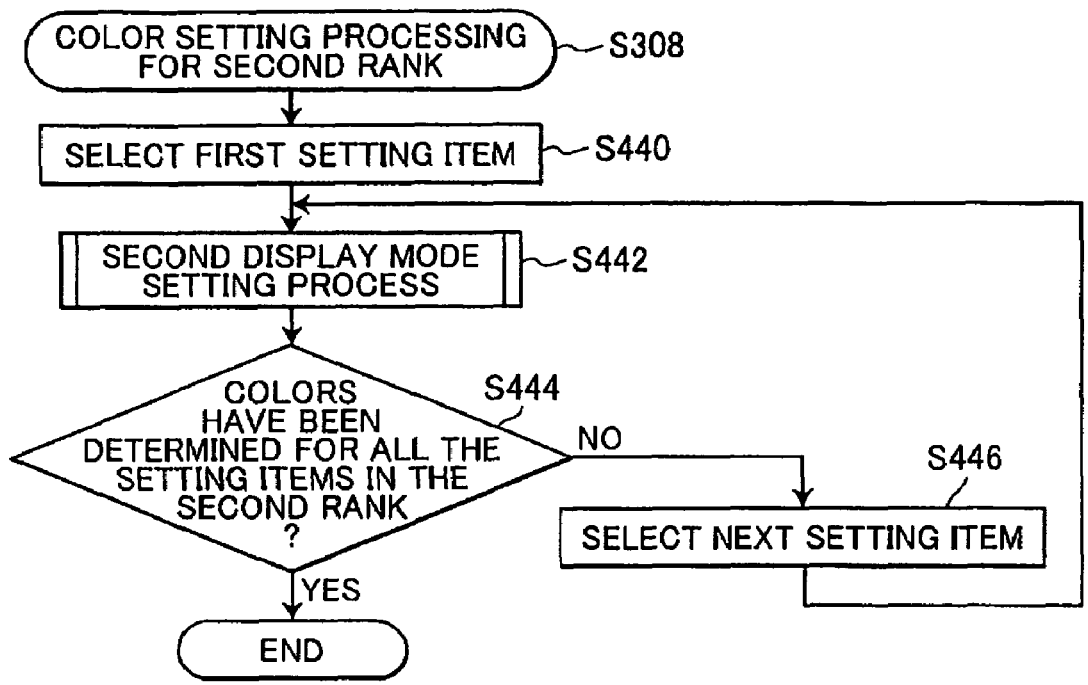
FIG. 18 is a flowchart of a color setting processing for the second rank in the flowchart of FIG. 15.

Next, the color setting processing for the setting items in the second rank of S308 will be described with reference to FIG. 18.

When the color setting processing for the setting items in the second rank is started, first, in S440, the CPU 11 selects one setting item (first setting item) among all the second-rank setting items. Next, the CPU 11 performs in S442 the second display mode setting process of FIG. 21 to set a display mode (color) for the selected setting item. It is noted that in S442, the CPU 11 further sets display modes (colors) for setting values of the first and second printers fox the selected setting item if the setting values exist in direct correspondence with the selected setting item. Next, in S444, the CPU 11 judges whether or not display modes (colors) have been determined for all the setting items in the second rank. When display modes (colors) have not yet been determined for all the setting items in the second rank (no in S444), the process goes to S446 wherein the CPU 11 selects another second-rank setting item whose display mode (color) has not yet been set, and the process returns to S442. On the other hand, when display modes (colors) have been determined for all the setting items in the second rank (yes in S444), the color setting processing of S308 for the setting items in the second rank is completed.

Figure 19:
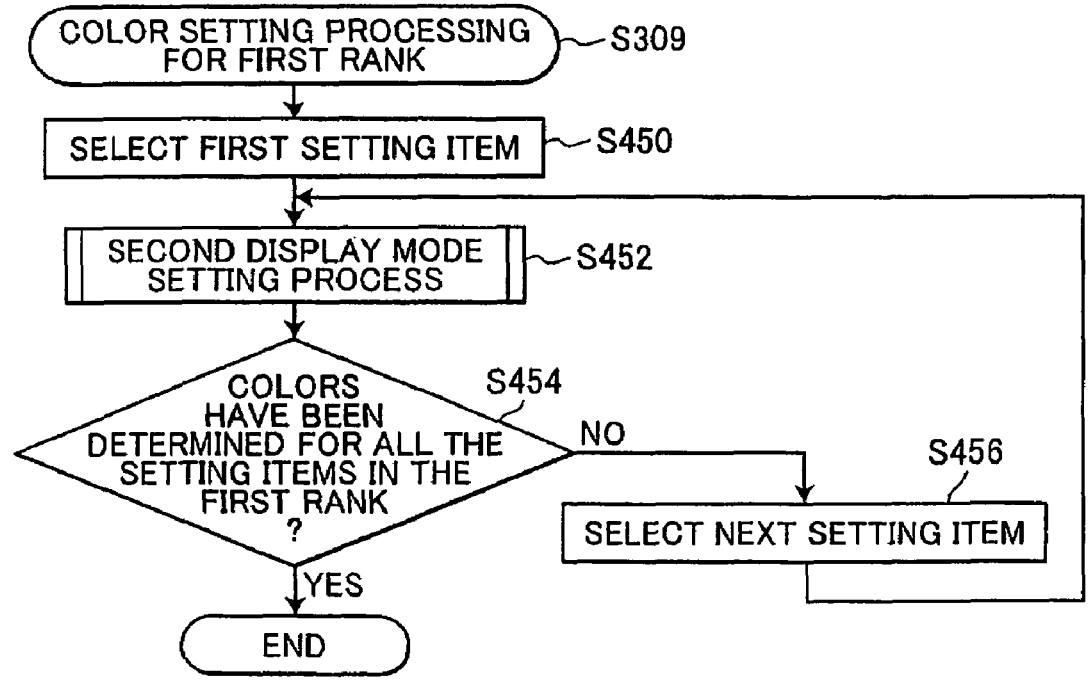
FIG. 19 is a flowchart of a color setting processing for the first rank in the flowchart of FIG. 15.

Next, the color setting processing for the setting items in the first rank of S309 will be described with reference to FIG. 19.

Figure 21:
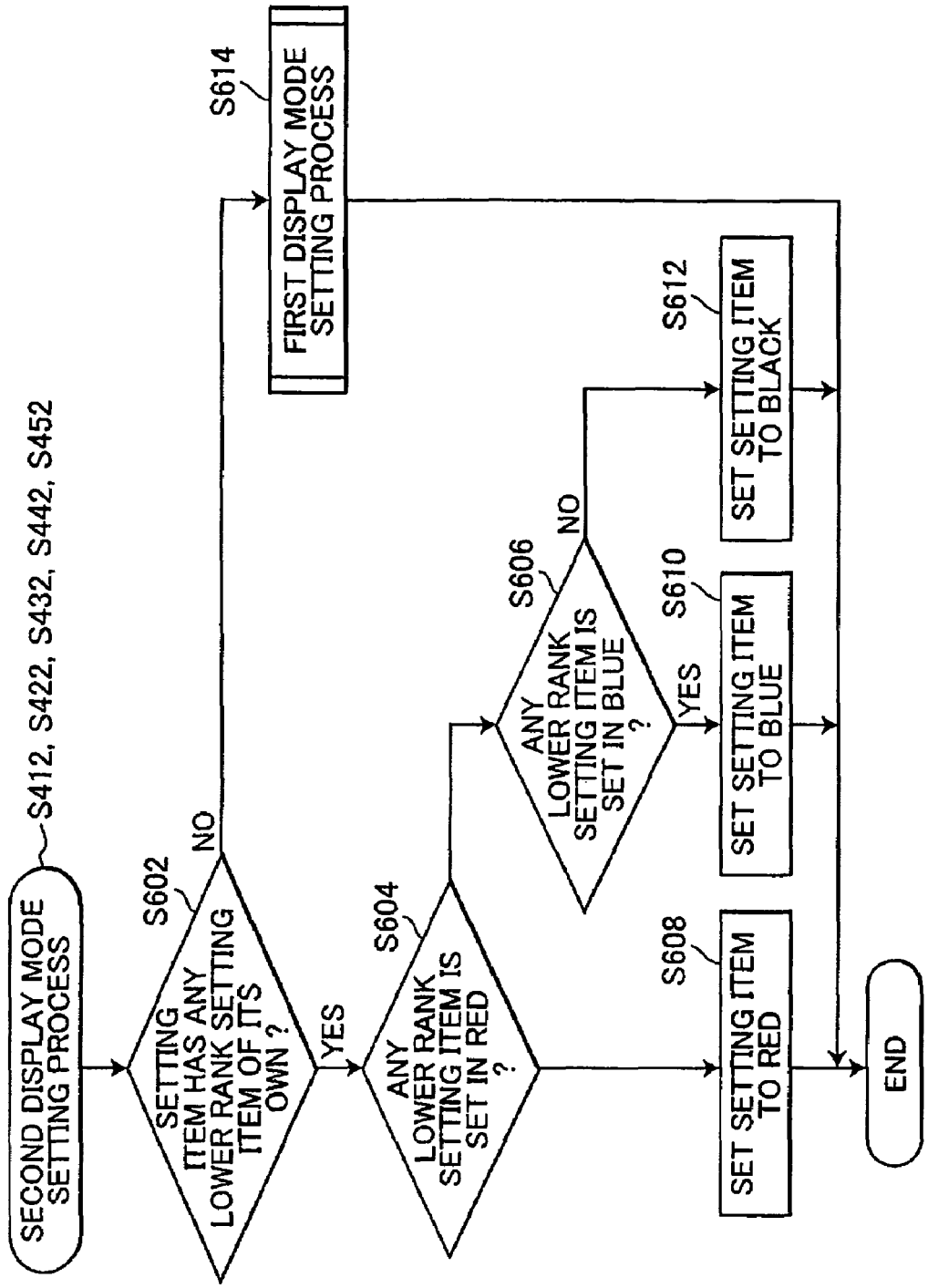
FIG. 21 is a flowchart of a second display mode setting process in the flowcharts of FIGS. 16B-19.

When the color setting processing for the setting items in the first rank is started, first, in S450, the CPU 11 selects one setting item (first setting item) among all the first-rank setting items Next, the CPU 11 performs in S452 the first display mode setting process of FIG. 21 to set a display mode (color) for the selected setting item. It is noted that in S452, the CPU 11 further sets display modes (colors) for setting values of the first and second printers for the selected setting item if the setting values exist in direct correspondence with the selected setting item. Next, in S454, the CPU 11 judges whether or not display modes (colors) have been determined fox all the setting items in the first rank. When display modes (colors) have not yet been determined for all the setting items in the first rank (no in S454), the process goes to S456 wherein the CPU 11 selects another first-rank setting item whose display mode (color) has not yet been set, and the process returns to S452. On the other hand, when display modes (colors) have been determined for all the setting items in the first rank (yes in S454), the color setting processing of S309 fox the setting items in the first rank is completed.

In this way, in S301-S309, the setting list 63 composed of the setting items and the setting values which are written in respective colors is generated, and in S310, the comparison display window 43 (refer to FIGS. 24 to 27) including the setting list 63 is output for display on the display section 15 by the CPU 11.

In this example, as shown in FIGS. 24-27, setting items <Paper type> and <Print quality> and their setting values of the first and second printers are displayed in red. Further, <Basic setting> which is the higher setting item relative to <Print type> and <Print quality> is displayed in red (refer to FIG. 24). Further, setting items <Frameless printing> and <Paper size> and their setting values of the second printer are displayed in red (refer to FIG. 25). A setting item <Bi-directional printing> which is the lower setting item relative to <Detailed print quality> is displayed in blue and the setting values thereof for the first and second printers is also displayed in blue (refer to FIG. 24). Since only the setting item <Bi-directional printing> shows a difference from the default printer among the lower setting items <Bi-directional printing>, <standard-fine printing>, and <image quality emphasis> fox the setting item <Detailed print quality>, the setting item <Detailed print quality> is displayed in blue. A setting item <Image type>, which is the lower setting item relative to the setting item <Advanced feature>, and the setting values thereof for the first and second printers axe displayed in blue (refer to FIG. 26). The setting items <Color> and <Advanced feature> which axe the higher setting items relative to the setting item <Image type> are also displayed in blue. Other setting items and their setting values are displayed in black.

The setting values which are different between the first and second printers are displayed in color of red, while the setting values which are the same between the first and second printers are displayed in color of black or blue. Further, the setting values which are the same between the first and second printers but are different from the default setting values are displayed in color of blue, while the setting values that are the same between the first and second printers and that are the same with the default setting values are displayed in color of black. So, setting values that are different between the first and second printers and setting values that axe different from the default setting values are emphasized on the comparison display window 43. This allows a user to easily grasp the setting values that are different between the first and second printers and the setting values that are different from the default setting values at first sight.

Note that, in the setting list 63 shown in the drawings, the display colors of the setting items and setting values other than those displayed in black are given in parenthesis. Specifically, (red) is appended to the setting items and setting values which are displayed in red, and (blue) is appended to the setting items and setting values which are displayed in blue.

As shown in FIGS. 24 to 27, on the comparison display window 43, the open/close marks 70 are provided on the left sides of all the title setting items that have their own lower rank setting items. It is noted that when the setting list 63 is generated, the open/close marks 70 are initially set to the minus state (−) or open state. So, all the setting items are opened to be displayed in S205. However, while viewing the comparison display window 43 (refer to FIGS. 24 to 27), a user can click his/her desired open/close mark 70 between the minus or open state (−) and the plus or close state (+). When the open/close mark 70 on the left side of some title setting item is turned to the close state (+), all the lower rank setting items for the title setting item are closed so as not to be displayed.

Figure 14:
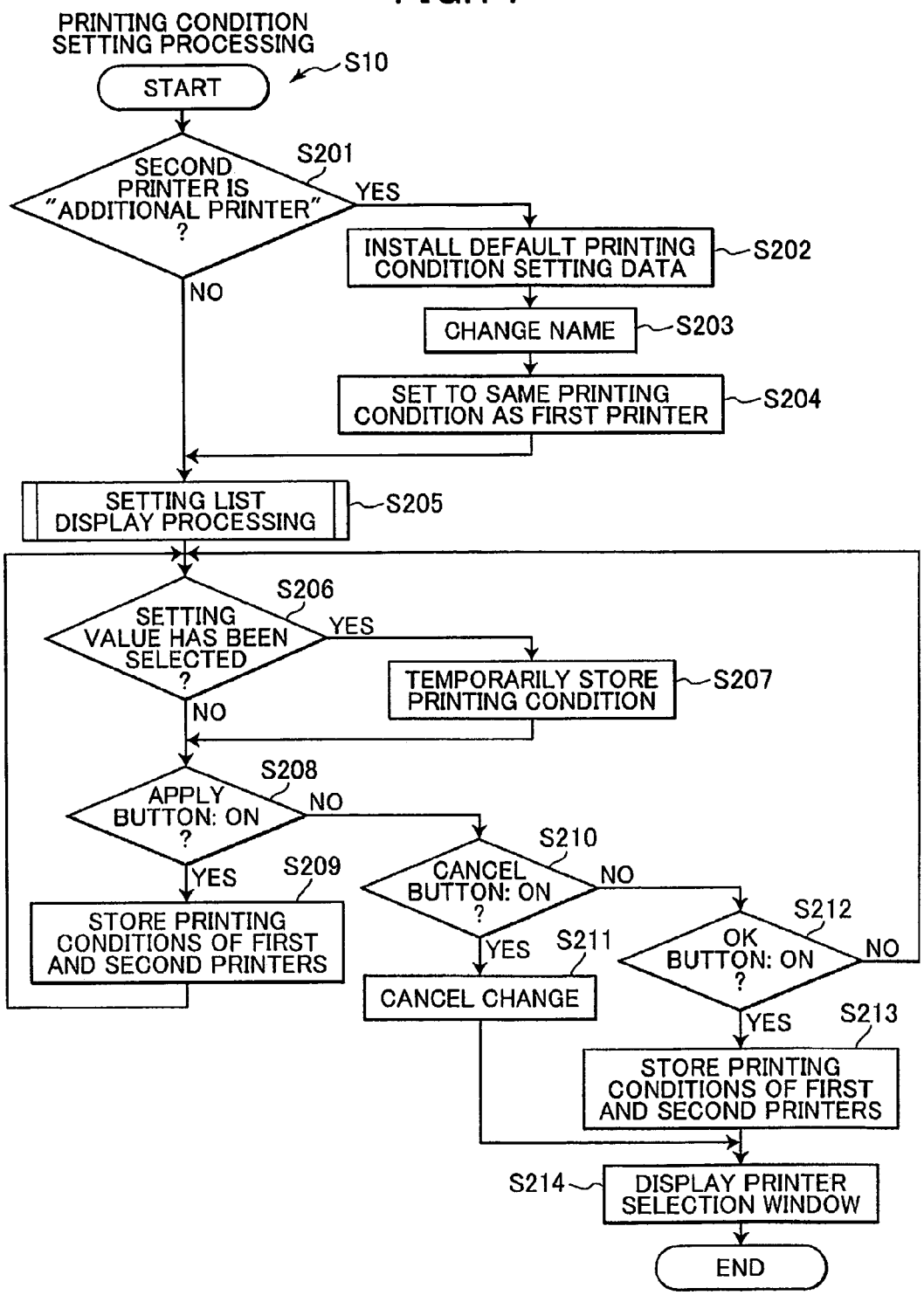
FIG. 14 is a flowchart of a printing condition setting processing in the flowchart of FIG. 12.
Figure 22:
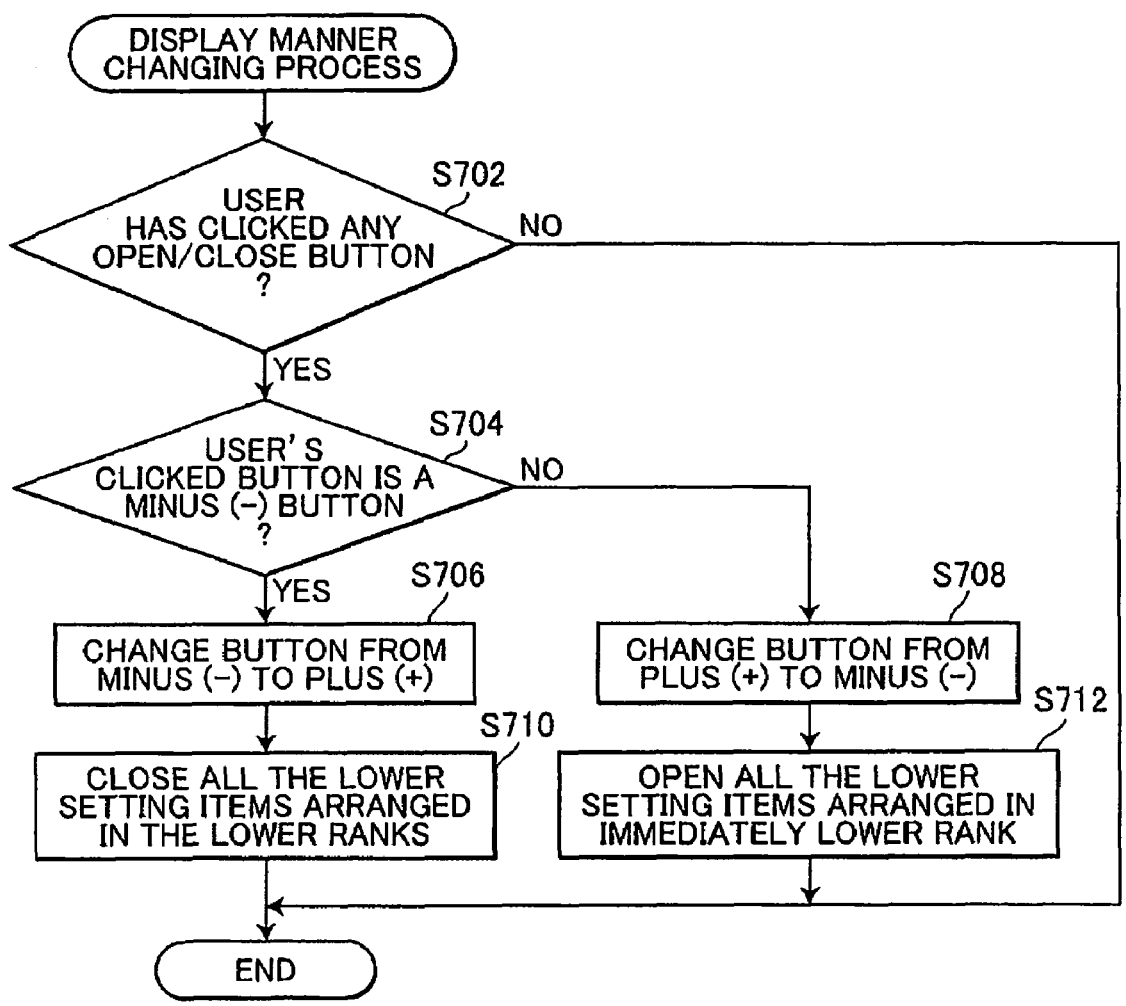
FIG. 22 is a flowchart of a display manner changing process.

More specifically, after the comparison display window 43 of FIGS. 24-27 is generated to be displayed through the process of S205, a display manner changing process of FIG. 22 is repeatedly executed as an interrupt routine while the processes of S206 through S213 of FIG. 14 are being executed. That is, the CPU 11 first judges in S702 whether or not the user has clicked any open/close button 70. If so (yes in S702), the CPU 11 judges whether or not the user's clicked open/close button 70 is in the minus or open (−) state in S704. If the user's clicked open/close button 70 is in the minus (−) state (yes in S704), the CPU 11 changes the button from minus (−) to plus (+) in S706. Then, the CPU 11 closes all the lower setting items that are located in the lower rank side of the open/close button 70 in S710. That is, the CPU 11 closes all the setting items that are located in all the lower ranks relative to the title setting item for the subject open/close button 70. On the other hand, if the user's clicked open/close button 70 is in the plus or close (+) state (no in S704), the CPU 11 changes the button from plus (+) to minus (−) in S708. Then, the CPU 11 opens in S712 all the lower setting items that are located in an immediately lower rank relative to the subject open/close button 70. That is, the CPU 11 opens all the lower setting items that are located in a rank that is one step lower than the title setting item for the subject button.

Figure 28A:
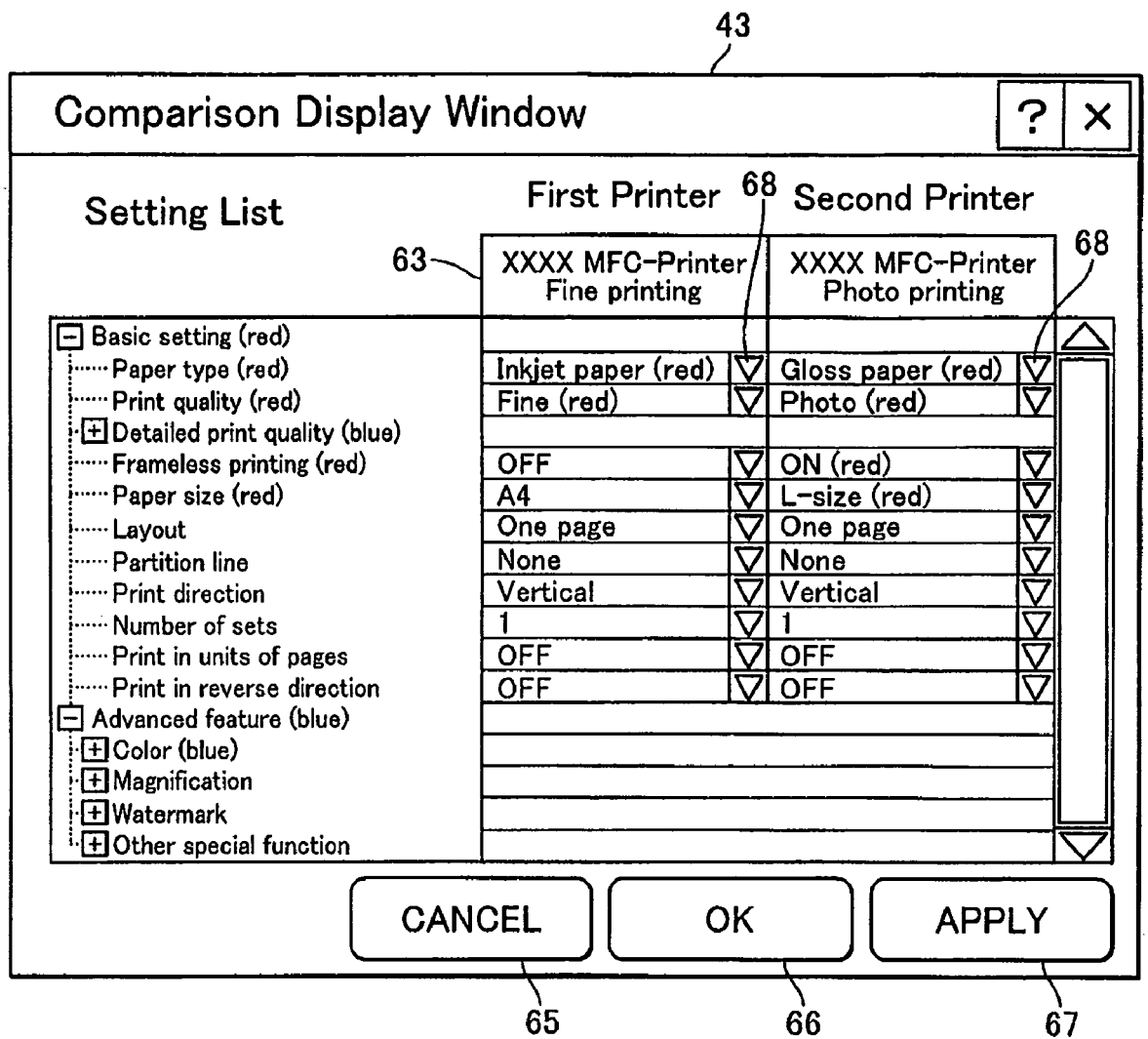
FIG. 28A is a view showing another example of the comparison display window.

For example, by changing the open/close marks 70 for the title setting items <detailed print quality>, <color>, <magnification>, and <watermark> from (−) to (+), the setting list 63 on the comparison display window 43 is changed from the state shown in FIGS. 24-27 into the state shown in FIG. 28A. The lower-rank setting items relative to the title setting items <detailed print quality>, <color>, <magnification>, and <watermark> are closed. Still, the color of each title setting item <detailed print quality>, <color>, <magnification>, and <watermark> can properly indicate whether the title setting item has at least one lower-rank setting item of its own that is set to red or blue. For example, because the title setting it <detailed print quality> is displayed in blue, it indicates that there is at least one lower-rank setting item whose setting value is blue, although no lower-rank setting items or no setting values are not indicated for the title setting item <detailed print quality>.

Since all the setting items are displayed on the setting list 63 in the state of FIGS. 24-27, a user needs to scroll the window in order to find all the setting items, at which the printing conditions of the first and second printers are different from each other or at which the printing condition of at least one of the first and second printers is different from the default printer. On the other hand, only the user's desired higher setting items axe displayed in the state of FIG. 28A. So, the display contents can be set within a single window view. As a result, differences at the higher setting items can be grasped at first sight.

Figure 28B:
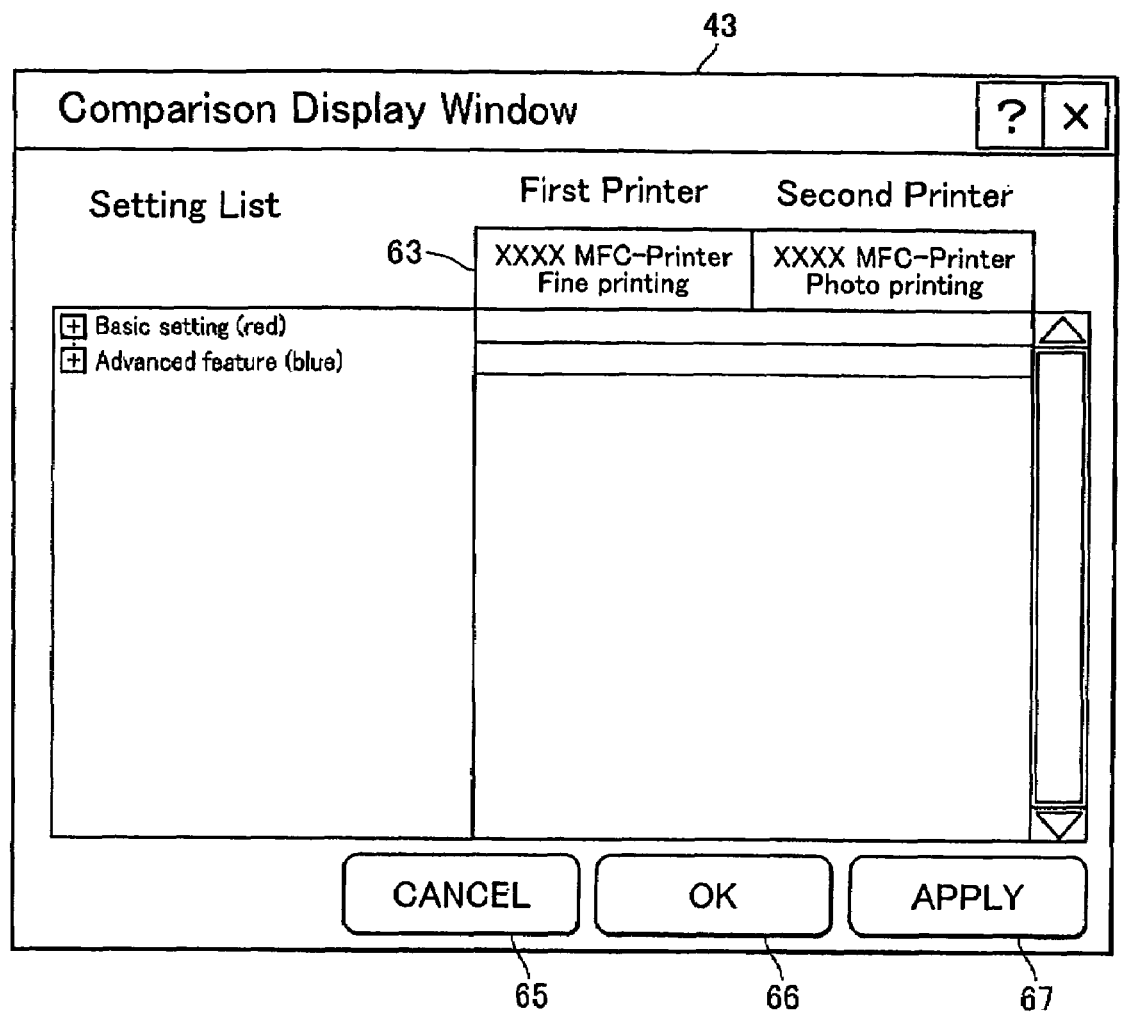
FIG. 28B is a view showing still another example of the comparison display window.

When the user changes the open/close marks 70 for the title setting items <basic setting> and <advanced feature> to plus (+), the comparison display window 43 will be as shown in FIG. 28B.

Figure 29:
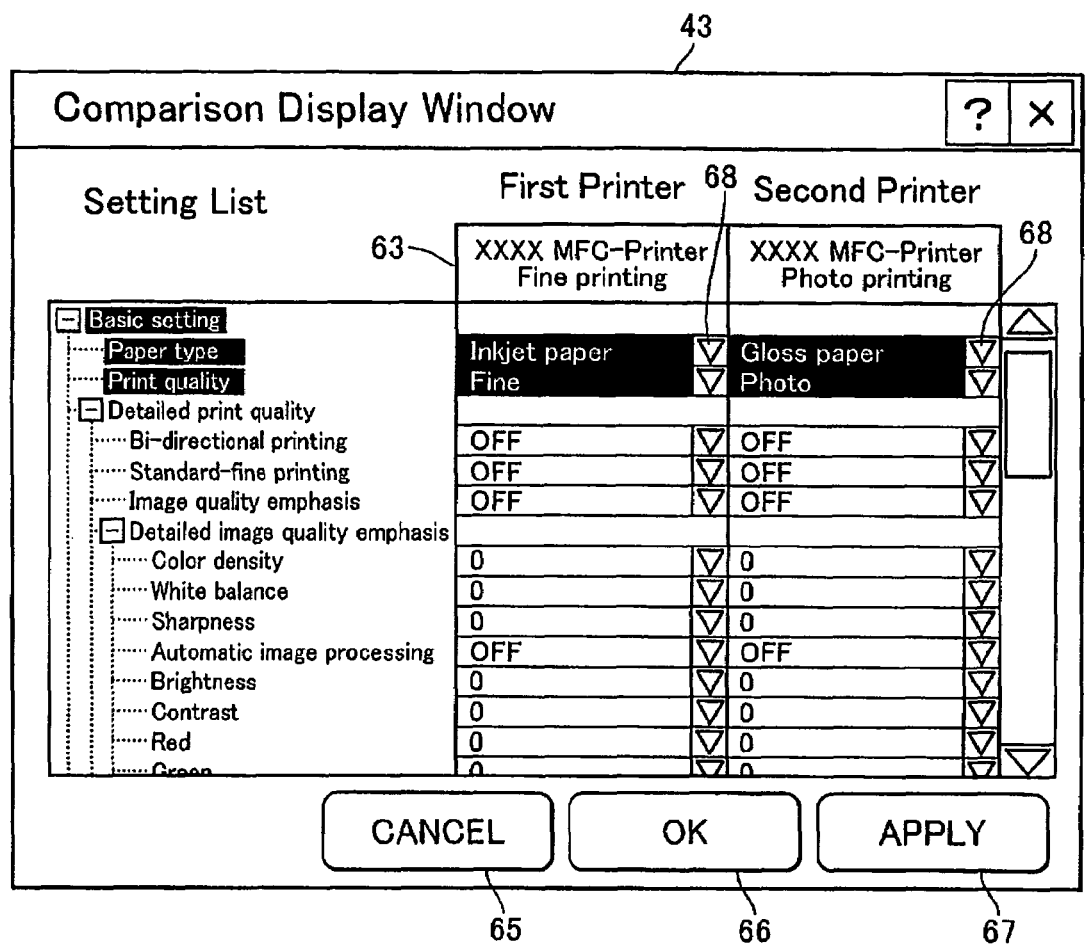
FIG. 29 is a view showing a part of a modification of the comparison display screen.

In the above description, the display colors of the setting items and setting values are changed. Instead, as shown in FIG. 29, the setting values that have been determined by comparison to be the same as each other may be displayed in black text on a white background, while the setting values that have been determined to be different from each other are displayed in white text on a black background. In this case, the setting item of the setting values that have been determined to be different is also displayed in white text on a black background. The color of background and text is not limited to black and white but every color can be adopted. The setting values determined to be different from each other may be emphasized by differentiating the brightness of similar colors.

Figure 30:
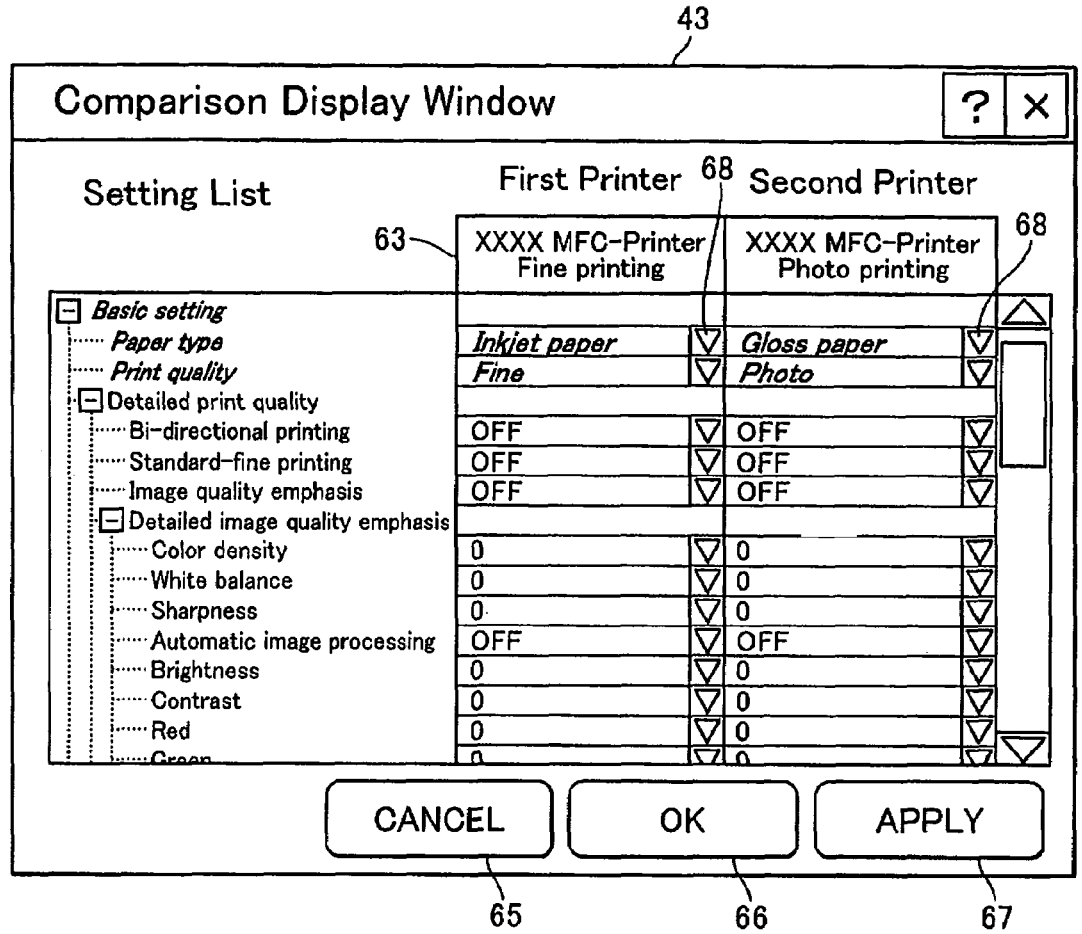
FIG. 30 is a view showing a part of another modification of the comparison display screen.

Or, as shown in FIG. 30, the setting values determined by comparison to be the same as each other may be displayed in a standard font, while the setting values determined to be different from each other are displayed in a font larger than the standard font. Further, as shown in FIG. 30, the setting values determined to be different from each other may be displayed in an italic font. In this case, the setting item of the setting values that have been determined to be different is also displayed in an italic font. Although not shown, only the setting values determined to be different from each other may be displayed in a dashed font or may be blinked. Also in this case, the setting values determined to be different from each other are emphasized to be easily recognized by a user.

While the invention has been described in detail with reference to the embodiment thereof, it would be apparent to those skilled in the art that various changes and modifications may be made therein without departing from the spirit of the invention.

For example, although the setting value of the default printer is used as the default setting value in the above embodiment, a default condition value previously stored in a predetermined storage area as default information specific to a printer driver is used to perform a comparison with the printing condition of the selected virtual printer. Further, although the driver comparison tool can be activated on the printing window 31 in the above embodiment, the driver comparison tool may be an application program independent of a printer driver. This allows the driver comparison tool to be activated independently of the printer driver.

What is claimed is:

1. An information processing apparatus for displaying and setting operating conditions of a peripheral device, the information processing apparatus comprising:
   a display unit;
   an operating condition selection unit selecting two or more operating conditions from a plurality of operating conditions;
   a first comparison unit comparing the selected two or more operating conditions for each of a plurality of operating condition items that constitute each operating condition; and
   a first display control unit controlling the display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

2. The information processing apparatus according to claim 1, wherein the plurality of operating condition items are arranged hierarchically, and include a higher-rank operating condition item and at least one lower-rank operation condition item related to the higher-rank operating condition item,
   further comprising a higher-rank display-mode setting unit that sets a higher-rank display mode, in which when the value of at least one of the at least one lower-rank operating condition item is different between the two or more operating conditions, the first display control unit controls the display unit to display the higher-rank operating condition item in the first display mode, while failing to display the at least one lower-rank operating condition item.

3. The information processing apparatus according to claim 2, further comprising a hierarchical display-mode setting unit that sets a hierarchical display mode, in which when the value of at least one of the at least one lower-rank operating condition item is different between the two or more operating conditions, the first display control unit controls the display unit to display, in the first display mode, both of the at least one of the at least one lower-rank operating condition item and the higher-rank operating condition item.

4. The information processing apparatus according to claim 1, wherein the first display mode and the second display mode are different from each other in their color.

5. The information processing apparatus according to claim 1, further comprising:
   a storage unit storing a default operating condition;
   a second comparison unit comparing one of the selected two or more operating conditions with the default operating condition for each of the plurality of operating condition items that constitute each of the plurality of operating conditions and the default operating condition; and
   a second display control unit controlling the display unit to display an operating condition item, of the one of the selected two or more operation conditions, whose value is different from the default operating condition in a display mode different from a display mode for displaying another operating condition item, of the one of the selected two or more operation conditions, whose value is identical to the default operating condition.

6. The information processing apparatus according to claim 5, wherein the second display control unit controls the display unit to display an operating condition item, of the one of the selected two or more operation conditions, whose value is different from the default operating condition, in a color different from another color for displaying another operating condition item, of the one of the selected two or more operation conditions, whose value is identical to the default operating condition.

7. The information processing apparatus according to claim 1, further comprising a changing unit changing the value of one of the operating condition items for one of the selected two or more operation conditions.

8. An information processing method for displaying and setting operating conditions of a peripheral device, the information processing method comprising:
   selecting two or more operating conditions from a plurality of operating conditions;
   comparing the selected two or more operating conditions for each of a plurality of operating condition items that constitute each operating condition; and
   controlling a display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

9. The information processing method according to claim 8, wherein the plurality of operating condition items are arranged hierarchically, and include a higher-rank operating condition item and at least one lower-rank operation condition item related to the higher-rank operating condition item,
   further comprising setting a higher-rank display mode,
   wherein during the higher-rank display mode, when the value of at least one of the at least one lower-rank operating condition item is different between the two or more operating conditions, the display unit is controlled to display the higher-rank operating condition item in the first display mode, while failing to display the at least one lower-rank operating condition item.

10. The information processing method according to claim 9, further comprising setting a hierarchical display mode,
    wherein during the hierarchical display mode, when the value of at least one of the at least one lower-rank operating condition item is different between the two or more operating conditions, the display unit is controlled to display, in the first display mode, both of the at least one of the at least one lower-rank operating condition item and the higher-rank operating condition item.

11. The information processing method according to claim 8, wherein the first display mode and the second display mode are different from each other in their color.

12. The information processing method according to claim 8, further comprising:
    comparing one of the selected two or more operating conditions with the default operating condition for each of the plurality of operating condition items that constitute each of the plurality of operating conditions and the default operating condition; and
    controlling the display unit to display an operating condition item, of the one of the selected two or more operation conditions, whose value is different from the default operating condition in a display mode different from a display mode for displaying another operating condition item, of the one of the selected two or more operation conditions, whose value is identical to the default operating condition.

13. The information processing method according to claim 12, wherein the display unit is controlled to display an operating condition item, of the one of the selected two or more operation conditions, whose value is different from the default operating condition, in a color different from another color for displaying another operating condition item, of the one of the selected two or more operation conditions, whose value is identical to the default operating condition.

14. A storage medium storing a set of program instructions, executable on a data processing device, for displaying and setting operating conditions of a peripheral device, the instructions comprising:
   selecting, with the data processing device, two or more operating conditions from a plurality of operating conditions;
   comparing the selected two or more operating conditions for each of a plurality of operating condition items that constitute each operating condition; and
   controlling a display unit to display the selected two or more operating conditions by displaying, in a first display mode, an operating condition item whose value is different between the two or more operating conditions and by displaying, in a second display mode different from the first display mode, another operating condition item whose value is identical between the two or more operating conditions.

15. The storage medium according to claim 14, wherein the plurality of operating condition items are arranged hierarchically, and include a higher-rank operating condition item and at least one lower-rank operation condition item related to the higher-rank operating condition item,
   further comprising setting a higher-rank display mode,
   wherein during the higher-rank display mode, when the value of at least one of the at least one lower-rank operating condition item is different between the two or more operating conditions, the display unit is controlled to display the higher-rank operating condition item in the first display mode, while failing to display the at least one lower-rank operating condition item.

16. The storage medium according to claim 15, further comprising setting a hierarchical display mode,
   wherein during the hierarchical display mode, when the value of at least one of the at least one lower-rank operating condition item is different between the two or more operating conditions, the display unit is controlled to display, in the first display mode, both of the at least one of the at least one lower-rank operating condition item and the higher-rank operating condition item.

17. The storage medium according to claim 14, further comprising:
   comparing one of the selected two or more operating conditions with the default operating condition for each of the plurality of operating condition items that constitute each of the plurality of operating conditions and the default operating condition; and
   controlling the display unit to display an operating condition item, of the one of the selected two or more operation conditions, whose value is different from the default operating condition in a display mode different from a display mode for displaying another operating condition item, of the one of the selected two or more operation conditions, whose value is identical to the default operating condition.

* * * * *